United States Patent
Zhang et al.

(10) Patent No.: US 10,451,757 B2
(45) Date of Patent: Oct. 22, 2019

(54) DETERMINING DISPLACEMENT BETWEEN SEISMIC IMAGES USING OPTICAL FLOW

(71) Applicant: BP Corporation North America Inc., Houston, TX (US)

(72) Inventors: Qie Zhang, Houston, TX (US); Bosen Du, Katy, TX (US)

(73) Assignee: BP Corporation North America Inc., Houston, TX (US)

( * ) Notice: Subject to any disclaimer, the term of this patent is extended or adjusted under 35 U.S.C. 154(b) by 297 days.

(21) Appl. No.: 15/459,552

(22) Filed: Mar. 15, 2017

(65) Prior Publication Data
US 2017/0285196 A1 Oct. 5, 2017

Related U.S. Application Data

(60) Provisional application No. 62/316,428, filed on Mar. 31, 2016.

(51) Int. Cl.
*G06K 9/00* (2006.01)
*G01V 1/36* (2006.01)
(Continued)

(52) U.S. Cl.
CPC .............. *G01V 1/36* (2013.01); *E21B 49/003* (2013.01); *G01V 1/30* (2013.01); *G01V 1/308* (2013.01); *G01V 1/38* (2013.01)

(58) Field of Classification Search
CPC . G01V 1/36; G01V 1/30; G01V 1/308; G01V 1/38; G01V 1/28; G01V 1/306;
(Continued)

(56) References Cited

U.S. PATENT DOCUMENTS 6,574,563 B1 * 6/2003 Nickel .................. G01V 1/28
702/14
7,082,368 B2 * 7/2006 Nickel .................. G01V 1/286
702/17
(Continued)

OTHER PUBLICATIONS

Gboyega Ayeni: "Time-Lapse Seismic Imaging by Linearized Joint inversion" Apr. 1, 2012, Stanford University, pp. 1-243. (Year: 2012).*
(Continued)

*Primary Examiner* — Jose L Couso
(74) *Attorney, Agent, or Firm* — Robert Hsiao

(57) ABSTRACT

A method for aligning a plurality of seismic images associated with a subsurface region of the Earth may include receiving the seismic images and determining a first respective relative shift volume between a first seismic image and a second seismic image, a second respective relative shift volume between the first seismic image and a third seismic image, and a third respective relative shift volume between the second seismic image and the third seismic image. The method may include determining a first shift volume associated with the first seismic image and a second shift volume associated with the second seismic image based on the first, second, and third respective relative shift volumes. The method may then apply the first shift volume to the first seismic image and the second shift volume to the second seismic image.

35 Claims, 8 Drawing Sheets

(51) Int. Cl.
*E21B 49/00* (2006.01)
*G01V 1/30* (2006.01)
*G01V 1/38* (2006.01)

(58) Field of Classification Search
CPC ........ G01V 1/366; G01V 1/345; G01V 1/301;
G01V 1/34; G01V 1/362; G01V 1/282;
G01V 1/364; G01V 2210/59; G01V
2210/66; G01V 2210/64; G01V
2210/643; G01V 2210/665; G01V
2210/74; G01V 2210/679; E21B 49/003;
G06T 17/05; G06T 19/00; G06T 15/00;
G06T 1/00; G06T 5/00; G06T 7/00;
G06T 7/12; G06T 7/174; G06T 7/11;
G06T 7/13; G06T 7/0002; G06T 7/0004;
G06T 7/10; G06T 7/20; G06T 7/50;
G06T 2207/20101; G06T 2207/20161;
G06T 2207/20068; G06T 2207/20116;
G06T 2207/30181; G06T 2207/20081;
G06K 9/00624; G06K 9/0063; G06K
9/0014; G06K 9/4638; G06K 9/40; G06K
9/46; G06K 9/4604; G06K 9/50; G06K
9/62; G06K 9/6201; G06K 9/6203; G06K
9/64; G06K 9/66; G06K 9/68; G06K
9/72; G06K 9/78; G06K 9/80; G06K
15/1872
See application file for complete search history.

(56) References Cited

U.S. PATENT DOCUMENTS

| | | | | |
|---|---|---|---|---|
| 7,626,887 B2* | 12/2009 | Aarre | ..................... | G01V 1/28 367/50 |
| 2003/0043693 A1 | 3/2003 | Eastwood et al. | | |
| 2003/0055568 A1 | 3/2003 | Zauderer et al. | | |
| 2011/0103184 A1 | 5/2011 | Westeng et al. | | |
| 2011/0118985 A1* | 5/2011 | Aarre | ..................... | G01V 1/301 702/16 |
| 2014/0293740 A1* | 10/2014 | Compton | ............... | G01V 1/362 367/11 |
| 2015/0110360 A1* | 4/2015 | Zhao | ..................... | G01V 1/362 382/109 |
| 2018/0059275 A1* | 3/2018 | Bandura | .................. | G01V 1/30 |
| 2018/0203144 A1* | 7/2018 | Karrenbach | ........... | G01V 1/288 |
| 2018/0246243 A1* | 8/2018 | Hirabayashi | ........... | G01V 1/301 |

OTHER PUBLICATIONS

International Patent Application No. PCT/US2017/022759 International Search Report and Written Opinion dated Jun. 21, 2017 (13 pages).
B.K.P. Horn and B.G. Schunck, "Determining Optical Flow." Artificial Intelligence, vol. 17, pp. 185-203, 1981.
D.N. Whitcombe et al: "B037 The Correlated Leakage Method—It's Application to Better Quantify Timing Shifts on 4D Data", 72nd EAGE Conference and Exhibition Incorporating SPE Europec 2010, vol. 72nd, Jun. 1, 2010, pp. 1-5.
B. D. Lucas and T. Kanade (1981), "An Iterative Image Registration Technique With An Application To Stereo Vision." Proceedings of Imaging Understanding Workshop, pp. 121-130.
Peter J. Burt and Edward H. Adelson, "The Laplacian Pyramid as a Compact Image Code." IEEE Transactions On Communications, vol. 31, No. 4, Apr. 1983.
J.C. VanDecar and R.S. Crosson (1990), "Determination of Teleseismic Relative Phase Arrival Times Using Multi-Channel Cross-Correlation and Least Squares" Bull. Sesmol. Soc. Am. 80, pp. 150-169.

* cited by examiner

|  |  |  |  |  |  |  | K = 4 |
|---|---|---|---|---|---|---|---|
| IMAGE 1 AS PILOT | (1, 2) | (1, 3) | (1, 4) | (1, 5) |  |  |  |
| IMAGE 2 AS PILOT |  | (2, 3) | (2, 4) | (2, 5) | (2, 6) |  |  |
| IMAGE 3 AS PILOT |  |  | (3, 4) | (3, 5) | (3, 6) | (3, 7) |  |
| IMAGE 4 AS PILOT |  |  |  | (4, 5) | (4, 6) | (4, 7) | (4, 8) |
| IMAGE 5 AS PILOT |  |  |  |  | (5, 6) | (5, 7) | (5, 8) |
| IMAGE 6 AS PILOT |  |  |  |  |  | (6, 7) | (6, 8) |
| IMAGE 7 AS PILOT |  |  |  |  |  |  | (7, 8) |

*FIG. 12*

DETERMINING DISPLACEMENT BETWEEN SEISMIC IMAGES USING OPTICAL FLOW

CROSS REFERENCE TO RELATED APPLICATIONS

This application claims priority, under 35 U.S.C. § 119(e), of Provisional Application No. 62/316,428 filed Mar. 31, 2016, incorporated herein by this reference.

BACKGROUND

The present disclosure relates generally to identifying changes within a subsurface region of the Earth over a period of time using seismic survey results. The present disclosure also relates generally to aligning seismic images that represent the same area of subsurface during a seismic survey.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending sound energy down into the ground and recording the reflected sound energy that returns from the geological layers within the subsurface region. During a seismic survey, an energy source is placed at various locations on or above the surface region of the Earth, which may include hydrocarbon deposits. Each time the source is activated, the source generates a seismic (e.g., sound wave) signal that travels downward through the Earth, is reflected, and, upon its return, is recorded using one or more receivers disposed on or above the subsurface region of the Earth. The seismic data recorded by the receivers may then be used to create an image or profile of the corresponding subsurface region.

Over time, as hydrocarbons are being extracted from the subsurface region of the Earth, the location, saturation, and other characteristics of the hydrocarbon reservoir and (e.g., overburden) within the subsurface region may change. As such, it may be useful to determine how the image or map of the subsurface region changes over time, such that the operations related to extracting the hydrocarbons may be modified to more efficiently extract the hydrocarbons from the subsurface region of the Earth.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Seismic data processing, such as seismic data registration, may involve determining a multi-dimensional displacement volume (which may be a shift solution indicative of position differences between corresponding events in two seismic images or datasets). Generally, the two seismic images may be acquired at two different times, but it should be noted that the seismic data registration techniques may also be performed using two seismic images acquired at the same time in order to align them (or to resolve differences) between the two images that should represent the same subsurface region of the Earth to improve the signal-to-noise ratio. In such cases the images represent the same subsurface but are created using different combinations of seismic sources and receivers.

In certain embodiments, to determine a multi-dimensional displacement volume between two seismic images, a computing system may initially receive two seismic images that represent the same subsurface region of the Earth at different times. Using each seismic image, the computing system may downscale (e.g., smaller size and lower resolution) the first seismic image (A) and the second seismic image (B) to generate a first scaled image ($A_1$) and a second scaled image ($B_1$), respectively based on a Gaussian pyramid. By comparing two downscaled images, the computing system may better handle large shifts and better overcome cycle-skipping issues that may not be achieved at the original scale.

After generating the two scaled images, the computing system may determine an initial scaled shift or displacement volume ($D_1$) (e.g., one shift vector at each voxel) of the first scaled image ($A_1$) and the second scaled image ($B_1$) by comparing the two scaled images. $D_1$ is called a "scaled" displacement volume because it is in the same downscale and has the same size and resolution of $A_1$ and $B_1$ which are lower than A and B. The scaled displacement volume ($D_1$) may represent how the seismic events or geological formations (e.g., geological layers or reflectors in terms of space) have changed between the two scaled images. In certain embodiments, the scaled displacement volume ($D_1$) may be determined using an optical flow algorithm, such as the Lucas-Kanade (LK) algorithm, the Horn-Schunck (HS) algorithm, or the like.

Upon determining the initial scaled displacement volume $D_1$, the computing system may use an optical flow algorithm to iteratively refine the scaled displacement volume ($D_1$) by further continuously comparing the first scaled image $A_1$ and the warped second scaled image ($B_1'$) produced by applying the scaled displacement volume ($D_1$) to the second scaled image ($B_1$) and updating the scaled displacement volume ($D_1$).

Upon determining the scaled displacement volume ($D_1$) between the two scaled images, the computing system may generate a displacement volume ($D_0$) based on the scaled displacement volume ($D_1$) and a scaling function. This scaling function may be defined by a Gaussian pyramid that is used to generate the first and second scaled images based on the first and second seismic images. The process creates the displacement volume ($D_0$) in the original scale and its size and resolution the same of the first seismic image (A) and the second seismic image (B). That is, the computing system may upscale the scaled displacement volume ($D_1$) according to the scaling function used to generate the first and second scaled images from the first and second seismic images.

Upon determining the displacement volume ($D_0$), the computing system may use an optical flow algorithm to iteratively refine the displacement volume ($D_0$) by further continuously comparing the first seismic image (A) and the warped second image (B') produced by applying the displacement volume ($D_0$) to the second seismic image (B) and updating the displacement volume ($D_0$). The displacement volume ($D_0$) may represent the multi-dimensional displacement volume (which may be a shift solution indicative of position differences between corresponding seismic events depicted in the two seismic images). That is, the displacement volume ($D_0$) may represent how the subsurface region of the Earth has changed between the time when the first seismic image was acquired and when the second seismic image was acquired.

The computing system may then apply the displacement volume ($D_0$) to the second seismic image (B) to generate a third seismic image (B'), which corresponds to a warped version of the second seismic image (B). As such, the seismic events depicted in the third seismic image (B') may be aligned with the seismic events depicted in the first seismic image (A). In certain embodiments, the computing system may then compare the third seismic image (B') to the first seismic image (A) to calculate a difference seismic image between the third seismic image (B') and the first seismic image (A). The displacement volume between the first and second images and/or the difference image between the first and third images may indicate changes in amplitude, reflectivity, velocity, density, and other properties regarding the reservoir or/and its overburden of the subsurface region of the Earth between when the first seismic image (A) was acquired and when the second seismic image (B) was acquired. These changes may not be readily discernible by virtue of an examination or analysis of the first or second seismic image (B) alone.

Although the foregoing discussion regarding the determination of the displacement vector volume is described by downscaling the two seismic images one time, it should be noted that, in certain embodiments, the computing system may not downscale seismic images. In this case, the computing system may first determine the initial multi-dimensional displacement volume (D) between the first seismic image (A) and the second seismic image (B), then iteratively refine the displacement volume (D), both using an optical flow algorithm.

Although the foregoing discussion regarding the determination of the displacement volume is described by downscaling the two seismic images one time, it should be noted that, in certain embodiments, the computing system may downscale each seismic image a number of times (L) to solve for even larger shifts between two input images. In this case, the computing system may generate scaled versions of the first and second seismic images by downscaling each image a number (L) of times. Using the resulting first scaled image ($A_L$) and the second scaled image ($B_L$) at the scale L where their size and resolution are the lowest, the computing system may determine an initial scaled displacement volume ($D_L$) at the same scale L between the first scaled image ($A_L$) and the second scaled image ($B_L$).

Upon determining the initial scaled displacement volume ($D_L$), the computing system may use an optical flow algorithm to iteratively refine the scaled displacement volume ($D_L$) by further continuously comparing the first scaled image ($A_L$) and the warped second scaled image ($B'_L$) produced by applying the scaled displacement volume ($D_L$) to the second scaled image ($B_L$) and updating the scaled displacement volume ($D_L$). That is, the computing system may then apply the scaled displacement volume ($D_L$) to a scale L version of the second seismic image ($B_L$). As such, the computing system may generate a warped version of the L scale version of the second seismic image ($B'_L$). Using the warped second seismic image ($B'_L$), the computing system may again determine a displacement volume ($\Delta D_L$) between the L scale version of the first seismic image ($A_L$) and the warped second seismic image ($B'_L$) according to the procedure described above. The computing system may then update the scaled displacement volume $D_L$ according to $D_L = D_L + \Delta D_L$. The process of refining $D_L$ can go on for a few iterations or the whole refining process can be skipped by a user's choice.

The computing system may then upscale the scaled displacement volume ($D_L$) using a scaling function between scale L and scale (L−1) to determine a scaled displacement volume ($D_{L-1}$). The generated displacement volume ($D_{L-1}$) has the same size and resolution of the first scaled image ($A_{L-1}$) and the second scaled image ($B_{L-1}$).

Upon determining the scaled displacement volume ($D_{L-1}$), the computing system may use an optical flow algorithm to iteratively refine the scaled displacement volume ($D_{L-1}$) by further continuously comparing the first scaled image ($A_{L-1}$) and the warped second scaled image ($B'_{L-1}$) produced by applying the scaled displacement volume ($D_{L-1}$) to the second scaled image ($B_{L-1}$) and updating the scaled displacement volume ($D_{L-1}$), as performed for scale L.

The computing system may continue determining the displacement volume at each scale until the computing system applies the respective displacement volume (e.g., the multi-dimensional displacement volume) to the original second seismic image (B). By determining a displacement volume from a scale of smallest size and lowest resolution to the original scale using a Gaussian pyramid, the computing system may more accurately identify large displacements and cycle-skipping between the two seismic images, thereby better analyzing how the subsurface region of the Earth has changed. Moreover, the computing system may use the multi-dimensional displacement volume to generate another seismic image that aligns the seismic events of the two original images, such that details regarding how the two images have changed may be better ascertained.

As a result, the multi-dimensional displacement volume may be used to predict how certain properties (e.g., reservoir presence and thickness, pressure changes, fluid flow, depleted & unswept zones) regarding a hydrocarbon reservoir or the area surround a hydrocarbon reservoir may change in the future. The properties may not be discernible upon analysis of the first or second seismic image (B) alone. Based on these predictions, various hydrocarbon drilling and production operations may be planned or adjusted to more efficiently extract hydrocarbons from the reservoir.

Moreover, after determining the multi-dimensional displacement volume between the two original images, as discussed above, the computing system may apply the multi-dimensional displacement volume to the second seismic image (B) to generate another seismic image (B') that aligns the corresponding seismic events of the first seismic image (A) and the second seismic image (B). The computing system may then determine a difference at each voxel between the third seismic image (B') and the first seismic image (A) to ascertain differences between the two images. Since the third seismic image (B') and the first seismic image (A) are properly aligned with each other after applying the multi-dimensional displacement volume to the second seismic image (B), the differences between the third seismic image (B') and the first seismic image (A) may assist in determining changes in amplitude, velocity, density, reflectivity, and other properties regarding the subsurface region of the Earth over time. The changes to these properties of the subsurface region may provide insight as to how the hydrocarbon reservoir has changed over time that may not be available upon inspection of the first seismic image (A) or second seismic image (B) alone. As such, hydrocarbon drilling and production operations may be planned or altered based on how the properties regarding the subsurface region of the Earth have changed over time.

In addition to determining the multi-dimensional displacement volume, the computing system may receive multiple seismic images of the same size or seismic image gathers that represent the same area of subsurface during a seismic survey. That is, the multiple seismic images are redundant measurements of the same subsurface area, out of a sorting and binning process of the input data or the intermediately-processed data in the seismic data processing. The binning criteria can be surface offsets, subsurface opening angles, source indices, receiver indices, or other properties. As such, each seismic image out of the multiple seismic images is an image produced using a subset (typically no overlapping) of the whole input data collected in a seismic survey.

In one embodiment, to resolve for the shift volumes among multiple seismic images, or to align seismic image gathers, a computing system may generate multiple equations for multiple displacement volumes ($D^{i,j}$) measured between multiple pairs of seismic images that represent the same subsurface area. Each equation for the respective displacement volume ($D^{i,j}$) may be determined according to the iterative scaling method briefly described above. After each equation for the respective displacement volume ($D^{i,j}$) of each of the multiple pairs of seismic images has been generated, the computing system may use the resulting system of equations to determine a volume of multi-dimensional vectors for each respective displacement volume ($D^i$). The computing system may then apply each respective displacement volume ($D^i$) to each respective seismic image, thereby aligning each of the seismic images that are generated using a subset of the whole data collected in a seismic survey. The displacement volumes can be used as an input to reflection tomography for updating a velocity model and therefore improving the quality of a seismic image. The aligned seismic images or flattened gathers that are sorted by surface offsets or subsurface opening angles can also be used for amplitude-versus-offset (AVO) processing, leading to a more accurate description of the reservoir characterization and rock properties. Moreover, the associated products such as a stack from the aligned seismic images may provide a more accurate representation of the subsurface region, such that hydrocarbon drilling and production operations may be adjusted to extract hydrocarbons from the subsurface region more efficiently. Further, it should be noted that the same principle of matching images described above for the purpose of aligning data that is acquired at the same time may also be performed for different combinations of sources and receivers to obtain better signal-to-noise ratio and to identify velocity errors etc.

In addition to the examples provided above, image or data registration techniques as described herein may be used for various applications in seismic data processing. For examples, the systems and methods described below may be used for matching modeled and observed data during waveform inversion (FWI) for the purposes of building velocity models, matching seismic data pre- or post-migration during the process of iterative de-migration or re-migration sequences, matching predicted and recorded multiples (and/or other types of predicted noise) during the process of multiple suppression & removal for enhancing the signal-to-noise ratio, signal tracking across various images and/or aligning signals for imaging focusing for the purposes of improving the image quality, misalignment picking for tomography or velocity inversion, measuring and tracking a rate of change in seismic movies, and the like.

Additional details with regard to determining the multi-dimensional displacement volume between two seismic images and aligning multiple seismic images will be described below with reference to FIGS. 1-14.

BRIEF DESCRIPTION OF THE DRAWINGS

Various aspects of this disclosure may be better understood upon reading the following detailed description and upon reference to the drawings in which:

FIG. 12 illustrates how pairs of seismic images are compared according to the method for aligning multiple seismic images of FIG. 11, in accordance with an embodiment;

DETAILED DESCRIPTION OF SPECIFIC EMBODIMENTS

Figure 1:
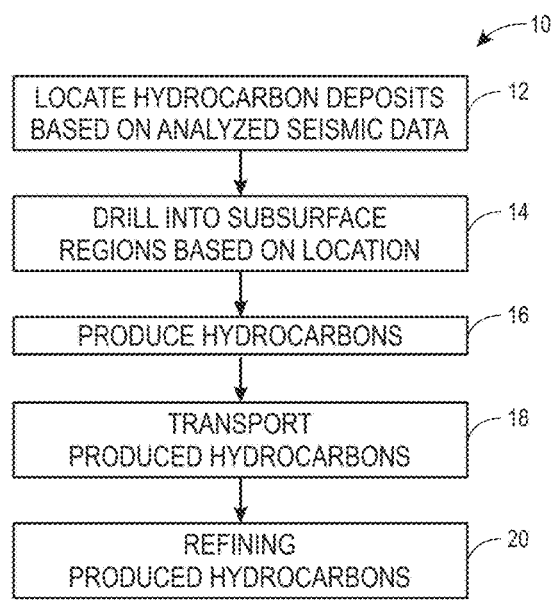
FIG. 1 illustrates a flow chart of various processes that may be performed based on analysis of seismic data acquired via a seismic survey system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed above, seismic data processing, such as seismic image registration, may provide valuable information with regard to the description such as the location and change of hydrocarbon deposits within a subsurface region of the Earth. In some instances, a seismic image acquired at one time may differ from another seismic image acquired at a later time due to the extraction of the hydrocarbon deposits, the associated geological formation movements, and the like. Based on how the geological formation of the Earth and the location and characteristics of the hydrocarbon deposits change over time, hydrocarbon production operations may be modified to extract hydrocarbon deposits more efficiently. Accordingly, it is valuable to have accurate data representing geological formations to aid in the modification of hydrocarbon production operations.

One manner of obtaining more accurate data representing geological formations includes determining a multi-dimensional displacement volume (which may be a shift solution indicative of position differences between seismic events depicted in the two seismic images) acquired by two differently positioned seismic receivers or by similarly positioned (e.g., the same) receivers at two different times to correlate the two images and produce new images that can be used to modify hydrocarbon drilling or production operations. In embodiments, the multi-dimensional displacement volume may be described as a volume of vector values (e.g., one scalar or vector value per pixel or voxel), such that component of a vector is a shift along a direction, where each vector value describes the shift in a number of directions (e.g., X, Y, Z, etc.).

In addition to determining the multi-dimensional displacement volume between two seismic images acquired at different times, the multi-dimensional displacement volume may also be determined between two or more seismic images or datasets acquired at substantially similar times or within the same survey but via selection of different subsets of the whole acquired data. Due to various features within the subsurface region of the Earth, energy (e.g., acoustic waveforms) transmitted into the Earth by a seismic source (e.g., vibrator, air gun) may be received by different receivers corresponding to different surface offsets or different subsurface opening angles. In the same way, a receiver can receive energy from different sources, also corresponding to different surface offsets or different subsurface opening angles. So the data collected during a seismic survey can be sorted and binned by surface offsets, subsurface opening angles, source number, receiver number, etc. and each binned subset of the whole data can produce an individual seismic image or data that represent the same subsurface region of the Earth. By determining the multi-dimensional displacement volume between these two or more seismic images according to the techniques described herein, a computing system may determine additional information regarding characteristics of the subsurface region. The computing system may then use these characteristics to update various seismic velocity models, seismic images, reservoir characteristic maps, and the like to more accurately determine the locations and properties of various geological formations within the subsurface region of the Earth. As such, hydrocarbon exploration operations (e.g., drilling, selection of drilling locations, production) may be improved by modifying the operations according to the updated locations and properties of the hydrocarbon deposits within the subsurface region according to the updated velocity models or updated seismic images.

Figure 2:
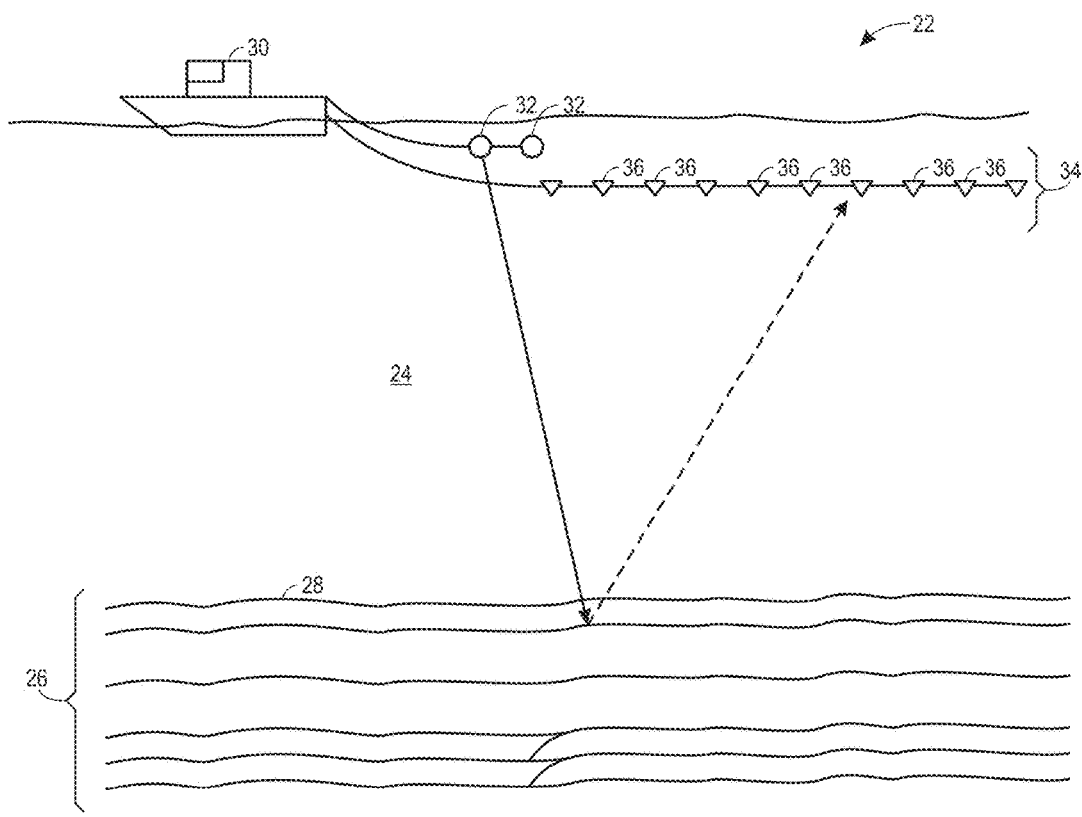
FIG. 2 illustrates a marine survey system in a marine environment, in accordance with embodiments presented herein.
Figure 3:
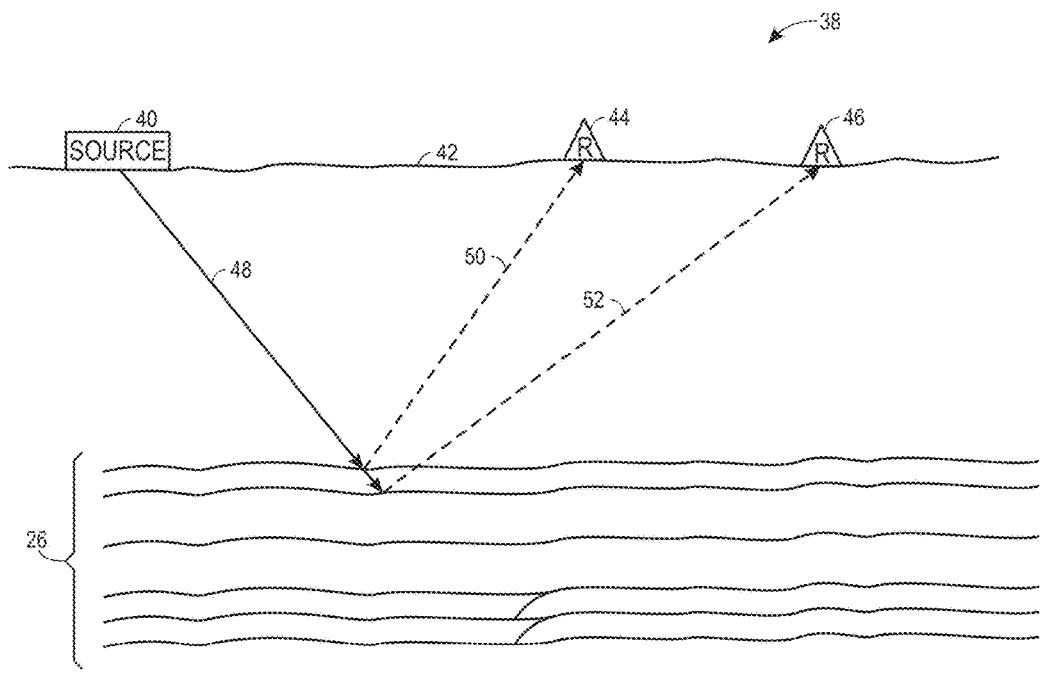
FIG. 3 illustrates a land survey system in a non-marine environment, in accordance with embodiments presented herein.

By way of introduction, seismic data may be acquired using a variety of seismic survey systems, two of which are discussed with respect to FIG. 2 and FIG. 3. Regardless of the seismic data gathering technique utilized, after the seismic data is acquired, a computing system may analyze the acquired seismic data and may use the results of the seismic data analysis (e.g., seismogram, map of geological formations, etc.) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it should be noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired via multiple sources and receivers or at different times may be analyzed to generate a map or profile that illustrates various geological formations within the subsurface region.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries and the like via transport vehicles, pipelines, and the like. At block 20, the produced hydrocarbons may be processed according to various refining procedures to develop different products using the hydrocarbons.

It should be noted that the processes discussed with regard to the method 10 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the subsurface region.

With the forgoing in mind, FIG. 2 illustrates a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, a seismic source 32, a streamer 34, a receiver 36, and/or other equipment that may assist in acquiring seismic images representative of geological formations within a subsurface region 26 of the Earth. The vessel 30 may tow the seismic source 32 (e.g., airgun array) that may produce energy, such as sound waves (e.g., seismic waveforms), that is directed at a seafloor 28. The vessel 30 may also tow the streamer 34 having a receiver 36 (e.g., hydrophones) that may acquire seismic waveforms that represent the energy output by the seismic sources 32 subsequent to being reflected off of various geological formations within the subsurface region 26. Although the receiver 36 is described as being towed by the vessel 30, in some embodiments, receiver 36 may also be deployed on the surface of the seafloor 28. Additionally, although the description of the marine survey system 22 is described with one seismic source 32 (represented in FIG. 2 as an airgun array) and one receiver 36 (represented in FIG. 2 as a plurality of hydrophones), it should be noted that the marine survey system 22 may include multiple seismic sources 32 and multiple seismic receivers 36. In the same manner, although the above descriptions of the marine survey system 22 is described with one seismic streamer 34, it should be noted that the marine survey system 22 may include multiple seismic streamers 34. In addition, additional vessels 30 may include additional sources 32, streamers 34, and the like to perform the operations of the survey system.

FIG. 3 illustrates a land survey system 38 (e.g., for use in conjunction with block 12 of FIG. 1) that may be employed to obtain information regarding the subsurface region 26 of the Earth in a non-marine environment. The land survey system 38 may include a land-based seismic source 40 and land-based receiver 44. In some embodiments, the land survey system 38 may include one or more multiple seismic sources 40 and one or more receivers 44 and 46. Indeed, for discussion purposes, FIG. 3 includes a land-based seismic source 40 and two seismic receivers 44 and 46. The land-based seismic source 40 (e.g., seismic vibrator) that may be disposed on a surface 42 of the Earth above the subsurface region 26 of interest. The land-based seismic source 40 may produce energy (e.g., sound waves, seismic waveforms) that is directed at the subsurface region 26 of the Earth. Upon reaching various geological formations (e.g., salt domes, faults, folds) within the subsurface region 26 the energy output by the land-based seismic source 40 may be reflected off of the geological formations and acquired or recorded by one or more land-based receivers (e.g., 44 and 46).

In some embodiments, the land-based receivers 44 and 46 may be dispersed across the surface 42 of the Earth to form a grid-like pattern. As such, each land-based receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first receiver 44 may receive the reflection of the seismic waveform 48 off of one geological formation and a second receiver 46 may receive the reflection of the seismic waveform 48 off of a different geological formation. As such, the first receiver 44 may receive a reflected seismic waveform 50 and the second receiver 46 may receive a reflected seismic waveform 52.

Figure 4:
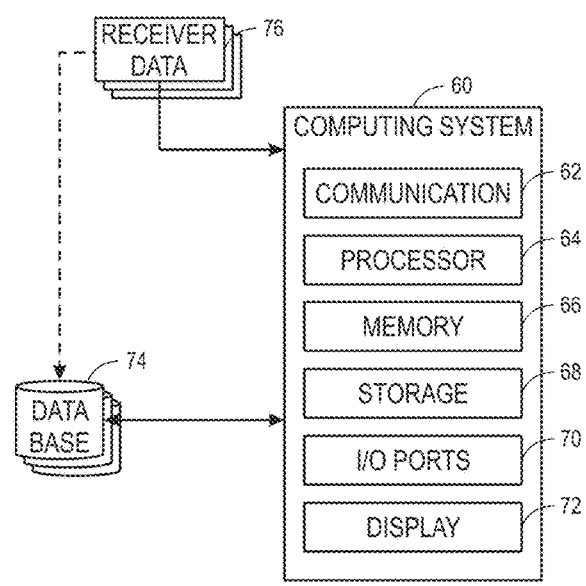
FIG. 4 illustrates a computing system that may perform operations described herein based on data acquired via the marine survey system of FIG. 2 or the land survey system of FIG. 3, in accordance with embodiments presented herein.

Regardless of how the seismic data is acquired, a computing system (e.g., for use in conjunction with block 12 of FIG. 1) may analyze the seismic waveforms acquired by the marine-based receivers 36 or the land-based receivers 44 and 46 to determine information regarding the geological structure, the location and property of hydrocarbon deposits, and the like within the subsurface region 26. FIG. 4 illustrates an example of such a computing system 60 that may perform various data analysis operations to analyze the seismic data acquired by the receivers 36, 44, or 46 to determine the structure of the geological formations within the subsurface region 26.

Referring now to FIG. 4, the computing system 60 may include a communication component 62, a processor 64, a memory 66, a storage 68, input/output (I/O) ports 70, a display 72, and the like. The communication component 62 may be a wireless or wired communication component that may facilitate communication between the receivers 36, 44, 46, one or more databases 74, other computing devices, and other communication capable devices. In one embodiment, the computing system 60 may receive receiver data 76 (e.g., seismic data, seismograms) that may have been previously acquired by seismic receivers via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also be used to store the data, analysis of the data, the software applications, and the like. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

The I/O ports 70 may be interfaces that may couple to other peripheral components such as input devices (e.g., keyboard, mouse), sensors, input/output (I/O) modules, and the like. I/O ports 70 may enable the computing system 60 to communicate with the other devices in the marine survey system 22, the land survey system 38, or the like via the I/O ports 70.

The display 72 may depict visualizations associated with software or executable code being processed by the processor 64. In one embodiment, the display 72 may be a touch display capable of receiving inputs from a user of the computing system 60. The display 72 may also be used to view and analyze results of the analysis of the acquired seismic data to determine the geological formations within the subsurface region 26, the location and property of hydrocarbon deposits within the subsurface region 26, and the like. The display 72 may be any suitable type of display, such as a liquid crystal display (LCD), plasma display, or an organic light emitting diode (OLED) display, for example. In addition to depicting the visualization described herein via the display 72, it should be noted that the computing system 60 may also depict the visualization via other tangible elements, such as paper (e.g., via printing) and the like.

With the foregoing in mind, the present techniques described herein may also be performed using a supercomputer that employs multiple computing systems 60, a cloud-computing system, or the like to distribute processes to be performed across multiple computing systems. In this case, each computing system 60 operating as part of a super computer may not include each component listed as part of the computing system 60. For example, each computing system 60 may not include the display component 72 since multiple display components 72 may not be useful to for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, and the like regarding the subsurface region 26.

Although the components described above have been discussed with regard to the computing system 60, it should be noted that similar components may make up the computing system 60. Moreover, the computing system 60 may also be part of the marine survey system 22 or the land survey system 38, and thus may monitor and control certain operations of the sources 32 or 40, the receivers 36, 44, 46, and the like. Further, it should be noted that the listed components are provided as example components and the embodiments described herein are not to be limited to the components described with reference to FIG. 4.

In some embodiments, the computing system 60 may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that can extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subsurface region 26.

In addition, a 4-D (or time-lapse) seismic survey may include seismic data acquired during a 3-D survey at multiple times. Using the different seismic images acquired at different times, the computing system 60 may compare the two images to identify changes in the subsurface region 26.

In any case, a seismic survey may be composed of a very large number of individual seismic recordings or traces. As such, the computing system 60 may be employed to analyze the acquired seismic data to obtain an image representative of the subsurface region 26 and to determine locations and properties of hydrocarbon deposits. To that end, a variety of seismic data processing algorithms may be used to remove noise from the acquired seismic data, migrate the pre-processed seismic data, identify shifts between multiple seismic images, align multiple seismic images, and the like.

After the computing system 60 analyzes the acquired seismic data, the results of the seismic data analysis (e.g., seismogram, seismic images, map of geological formations, etc.) may be used to perform various operations within the hydrocarbon exploration and production industries. For instance, as described above, the acquired seismic data may be used to perform the method 10 of FIG. 1 that details various processes that may be undertaken based on the analysis of the acquired seismic data.

Figure 5:
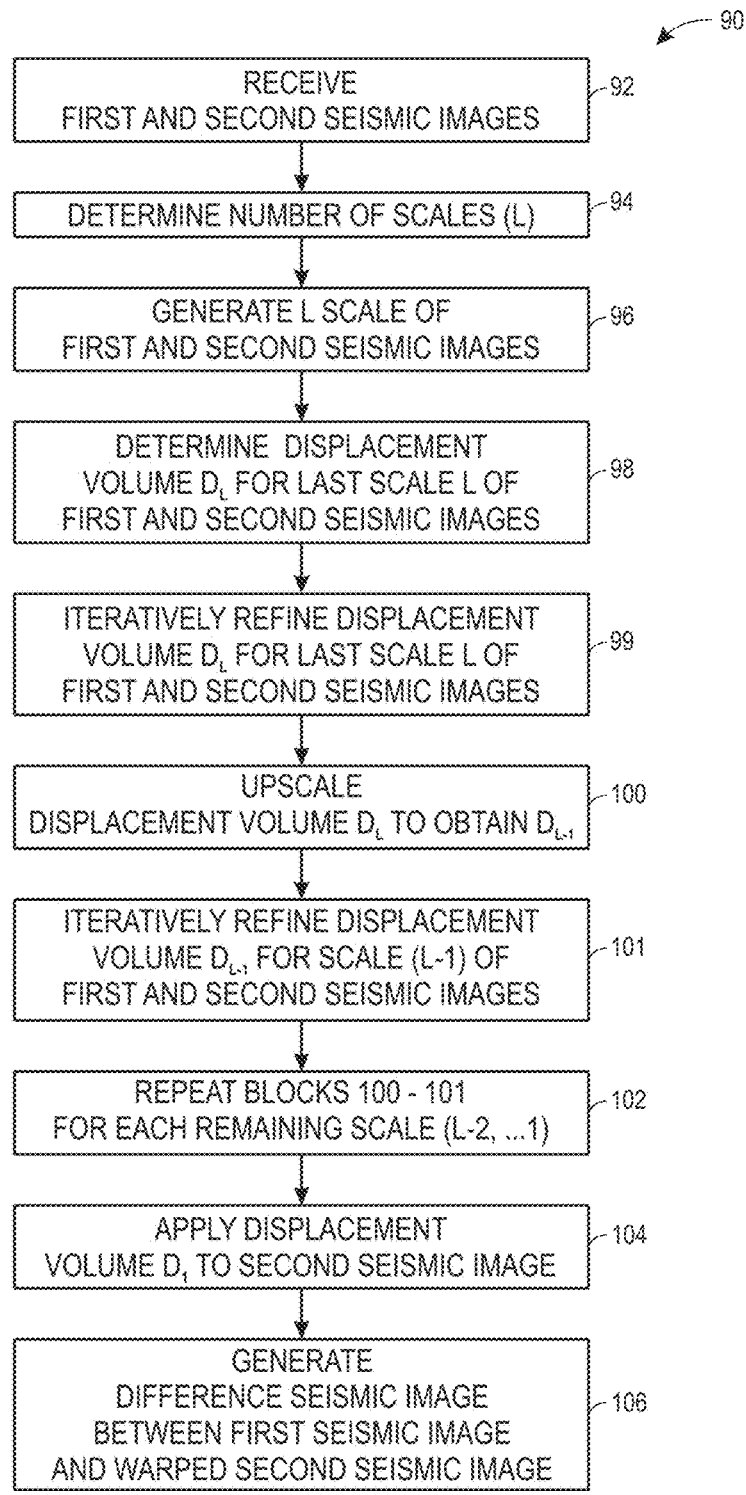
FIG. 5 illustrates a flow chart of a method for determining a displacement volume between two seismic images acquired via the marine survey system of FIG. 2 or the land survey system of FIG. 3, in accordance with embodiments presented herein.

With the foregoing in mind, FIG. 5 illustrates a method 90 that may be employed by the computing system 60 to determine a displacement volume between two seismic images acquired via the marine survey system 22 or the land survey system 38 (e.g., Vertical Seismic Profiling (VSPs)), such that the displacement volume between the two images indicate changes in amplitude, velocity, density, reflectivity, and other properties at each voxel. In certain embodiments, the displacement volume may be a volume of scalar values or vector values.

To determine a multi-dimensional displacement volume (which may be a shift solution indicative of position differences between two seismic images), the computing system 60 may determine a displacement vector per voxel (D=(u, v,w), where u, v, and w are two horizontal and one vertical components of the displacement volumes at one voxel for 3D input data) between two seismic images acquired via the marine survey system 22 or the land survey system 38 at each voxel in the seismic image being evaluated. The computing system 60 may use the displacement vectors at each voxel to generate the multi-dimensional displacement volume which, for example, may subsequently be used to modify (e.g., warp or image warp) the later acquired seismic image, such that seismic events present in both seismic images are aligned with each other. The computing system 60 may then identify the differences between the modified seismic image and the earlier acquired seismic image, together with the displacement volume between the first and second seismic images, to quantify how various properties (e.g., amplitude, velocity, density, reflectivity) within the subsurface region 26 changed over time. These changes may then be used to identify the changes of properties (e.g., saturation) of hydrocarbon deposits and associated overburdens, as well as other important information, as described above with regard to FIG. 1. Although the following description of the method 90 is described in a particular order, it should be noted that the method 90 may be performed in any suitable order.

Generally, the method 90 may be employed to determine the changes of properties of hydrocarbon deposits and associated overburdens, as well as other important information about the reservoir within the subsurface region 26. By determining a multi-dimensional displacement volume that provides a measure of how the seismic events (e.g., rock layers, reflectors, physical properties) within the subsurface region 26 change over time, the computing system 60 may be used to predict how the continued production of hydrocarbons in the subsurface region 26 may affect the reservoir in the future and help understand the property and behavior of the reservoir and its surroundings. As such, the computing system 60 may use these predictions and knowledge to determine future planning or modifications for exploration and production operations to improve the extraction of the hydrocarbons from the subsurface region 26. Moreover, the computing system 60 may use the multi-dimensional displacement volume to modify (e.g., warp) and align (e.g., shift seismic image to match seismic events of another seismic image) a later acquired seismic image with an earlier acquired seismic image to quantify changes between the two seismic images that may not be ascertained based solely on the earlier or later acquired seismic image. For instance, by analyzing the difference between the two aligned seismic images, the computing system 60 may better ascertain how a hydrocarbon reservoir behaves over time under certain hydrocarbon production conditions. These details may assist hydrocarbon drilling and production organization to determine where future wells should be drilled, what well interventions to perform, how hydrocarbons are to be recovered, and the like.

Additionally, the method 90 may also be employed by the computing system 60 to resolve misalignments between two or more seismic images or datasets acquired during the same seismic survey concerning the same subsurface region 26. Each one of those multiple images corresponds to a subset of the acquired data, selected by a range of properties, such as surface offsets, subsurface opening angles, source numbers, receiver numbers, or others. Those multiple images can be considered as redundant measures of the same subsurface region of interest. By determining one multi-dimensional displacement volume associated with each seismic image, those multiple seismic images can be aligned or registered, or in other words, the corresponding seismic image gathers can be flattened. That is, the computing system 60 may align each of the seismic images with each other, e.g., by using multiple multi-dimensional displacement volumes to modify (e.g., warp) and align each seismic image with the others. Those aligned multiple images and further derived products can be used to obtain a more accurate representation of the geological formations within the subsurface region 26.

With this in mind, for the purposes of discussion, the following description of the method 90 will be detailed with reference to seismic data representing a three-dimensional (3D) seismic image regarding the subsurface region 26 acquired at two or more different times. However, it should be understood that the method 90 may be performed using any suitable type of seismic data (e.g., two-dimensional seismic data, five-dimensional seismic data) acquired during the same seismic survey or during different seismic surveys, and the method 90 is not limited to 4D or time-lapse data.

Referring now to FIG. 5, at block 92, the computing system 60 may receive a first seismic image $P_1(x,y,z)$ and a second seismic image $P_2(x,y,z)$ associated with the same subsurface region 26 of the Earth, where (x,y,z) may represent three-dimensional coordinates within a Cartesian space, two-dimensional coordinates within a Cartesian space with respect to time, and the like. The first seismic image $P_1(x,y,z)$ and the second seismic image $P_2(x,y,z)$ are produced using seismic data previously acquired by receivers in the marine survey system 22, the land survey system 38, or the like at two different times.

At block 94, the computing system 60 may determine a number of scales in which both the first and second seismic images will be scaled. The scales may refer to a number of scales (L) that the respective seismic image may be downscaled L times according to L scaling functions. Given the high-resolution data available in each seismic image, downscaling the respective seismic image may better deal with large shifts or displacements. In one embodiment, the computing system 60 may determine the number of scales (L) using a Gaussian Pyramid. It should be noted that in some embodiments the scale level L may be one or a unity scale factor. As such, the computing system 60 may not downscale the seismic images when performing the method 90.

After determining the number of scales (L), the computing system 60 may generate L scaled versions of each respective seismic image at block 96. For example, the computing system 60 may create a Gaussian pyramid $P_1^1(x,y,z)$, $P_1^2(x,y,z)$, ..., $P_1^L(x,y,z)$ based on the number of scales (L) of the first seismic image $P_1(x,y,z)$ according to an extended 3D version of Burt and Adelson's (1983) approach. According to Burt and Adelson's approach, the computing system 60 may assign the seismic image $P_1^1(x,y,z)$ as a copy of the first seismic image $P_1(x,y,z)$ and the remaining scaled versions of the first seismic image $P_1(x,y,z)$ are corresponding Gaussian filtered lower resolution and lower size versions of the same. In the same manner, the computing system 60 may create a Gaussian pyramid $P_2^1(x,y,z)$, $P_2^2(x,y,z)$, ..., $P_2^L(x,y,z)$ for the second seismic image $P_2(x,y,z)$.

At block 98, the computing system 60 may determine a spatially varying displacement vector $(u_L, v_L, w_L)$ at the last scale L for each voxel based on an analysis between the first scaled seismic image $P_1^L(x,y,z)$ and the second scaled seismic image $P_2^L(x,y,z)$ at the scale L. The volume formed by displacement vectors $(u_L, v_L, w_L)$ represents the misalignment of the seismic events in the first scaled seismic image $P_1^L(x,y,z)$ and the second scaled seismic image $P_2^L(x,y,z)$ at the last scale L. The seismic events may refer to various geological formations within the subsurface region 26 and may indicate locations of various layers and reflectors in terms of a three-dimensional space. In certain embodiments, the displacement volume or vectors $(u_L, v_L, w_L)$ may be determined using an optical flow algorithm, such as the Lucas-Kanade (LK) algorithm, the Horn-Schunck (HS) algorithm, or the like. The optical flow algorithm may include any process that analyzes two images to identify a pattern of motions between the images. In this step, the optical flow algorithm is executed once and the displacement volume can be considered as initial displacement volume.

To more accurately determine the displacement volume $(u_L, v_L, w_L)$, the computing system 60 may proceed to block 99 and determine the displacement volume $(u_L, v_L, w_L)$ with iterative refinements for the last scale L, which will be described in greater detail with reference to FIG. 6.

After determining the displacement volume $(u_L, v_L, w_L)$ at scale L, the computing system 60 may, at block 100, upscale the displacement volume $(u_L, v_L, w_L)$ according to a scaling function between the scale L and the immediately next scale L−1. As such, the computing system may determine the displacement volume $(u_{L-1}, v_{L-1}, w_{L-1})$ at the scale L−1. After the up-scaled displacement volume $(u_{L-1}, v_{L-1}, w_{L-1})$ is determined, the displacement volume at scale L−1 is used as an initial displacement volume for iterative refinement at scale L−1.

To more accurately determine the displacement volume $(u_{L-1}, v_{L-1}, w_{L-1})$ at scale L−1, the computing system 60 may proceed to block 101 and determine the displacement volume $(u_{L-1}, v_{L-1}, w_{L-1})$ with iterative refinements. Similar to block 99 described above, additional details with regard to the iterative refinement process will be described in greater detail with reference to FIG. 6.

At block 102, the computing system 60 may repeat blocks 98-101 for each scale in which a corresponding displacement volume has not been determined. For instance, after the computing system 60 applies the up-scaled displacement volume $(u_{L-1},v_{L-1},w_{L-1})$ to the second scaled seismic image $P_2^{L-1}(x,y,z)$ at the scale L−1, the computing system 60 may generate a warped version of the second scaled seismic image $P'_2{}^{L-1}(x,y,z)$ at the scale L−1. The warped version of the second scaled seismic image $P'_2{}^{L-1}(x,y,z)$ represents the second scaled seismic image $P_2^{L-1}(x,y,z)$ modified using the up-scaled displacement volume $(u_{L-1},v_{L-1},w_{L-1})$. Using the warped version of the second scaled seismic image $P'_2{}^{L-1}(x,y,z)$ at the scale L−1, the computing system 60 may determine another displacement volume $\Delta(u_{L-1},v_{L-1},w_{L-1})$ at the scale L−1 between the first scaled seismic image $P_1^{L-1}(x,y,z)$ at scale L−1 and the warped version of the second scaled seismic image $P'_2{}^{L-1}(x,y,z)$ at scale level L−1. The computing system 60 then may update or refine the up-scaled displacement volume $(u_{L-1},v_{L-1},w_{L-1})$ by $(u_{L-1},v_{L-1},w_{L-1})=(u_{L-1},v_{L-1},w_{L-1})+\Delta(u_{L-1},v_{L-1},w_{L-1})$. The computing system 60 may iteratively repeat the process of refining the displacement volume $(u_{L-1},v_{L-1},w_{L-1})$ as described above. After determining the iteratively refined displacement volume $(u_{L-1},v_{L-1},w_{L-1})$ at the scale L−1, the computing system 60 may upscale the new displacement volume $(u_{L-1},v_{L-1},w_{L-1})$ at the scale L−1 based on the scaling function between scale L−1 and its immediately preceding scale L−2. The computing system 60 may then apply the up-scaled new displacement volume $(u_{L-2},v_{L-2},w_{L-2})$ at the scale L−2 to the scaled version of the second seismic image $P_2^{L-2}(x,y,z)$ at the scale L−2 to generate a warped version of the second scaled seismic image $P'_2{}^{L-2}(x,y,z)$ at the scale L−2. The computing system 60 may then update or refine the displacement volume $(u_{L-2},v_{L-2},w_{L-2})$ at the scale L−2 by comparing $P_1^{L-2}(x,y,z)$ with $P'_2{}^{L-2}(x,y,z)$, and the process of refinement can be repeated iteratively.

Referring back to block 102 again, the computing system may repeat blocks 100 and 101 for each scale of seismic images that were generated at block 96 (e.g., L, L−1, L−2, . . . , 1. After repeating blocks 100 and 101 L−1 times, the computing system 60 may determine an up-scaled displacement volume $(u_1,v_1,w_1)$ at the scale 1 or the original scale of the first and second seismic images received at block 92. The up-scaled displacement volume $(u_1,v_1,w_1)$ at the scale 1 represents a measurement of how the seismic events of the subsurface region 26 may change between when the first seismic image $P_1(x,y,z)$ was acquired and when the second seismic image $P_2(x,y,z)$ was acquired (e.g., the up-scaled displacement volume $(u_1,v_1,w_1)$ may represent the multi-dimensional displacement volume, which may be a shift solution indicative of position differences between seismic events depicted in the two seismic images).

At block 104, the computing system 60 may apply the up-scaled displacement volume $(u_1,v_1,w_1)$ to the second seismic image $P_2(x,y,z)$ to generate a warped version of the second seismic image $P'_2(x,y,z)$. As such, the seismic events depicted in the warped version of the second seismic image $P'_2(x,y,z)$ should now align with the seismic events of the first seismic image $P_1(x,y,z)$. In some embodiments, the computing system 60 may then, at block 106, determine a seismic difference image based on a difference between the first seismic image $P_1(x,y,z)$ and the warped version of the second seismic image $P'_2(x,y,z)$. Both the displacement image and the difference image may indicate how the hydrocarbon reservoir within the subsurface region 26 changed between when the first seismic image $P_1(x,y,z)$ was acquired and when the second seismic image $P_2(x,y,z)$ was acquired. Both the displacement image and difference image may also help predict reservoir presence and thickness, pressure changes, fluid flow, depleted & unswept zones and more. Therefore they may be useful in planning to drill new wells and supporting well interventions.

Figure 6:
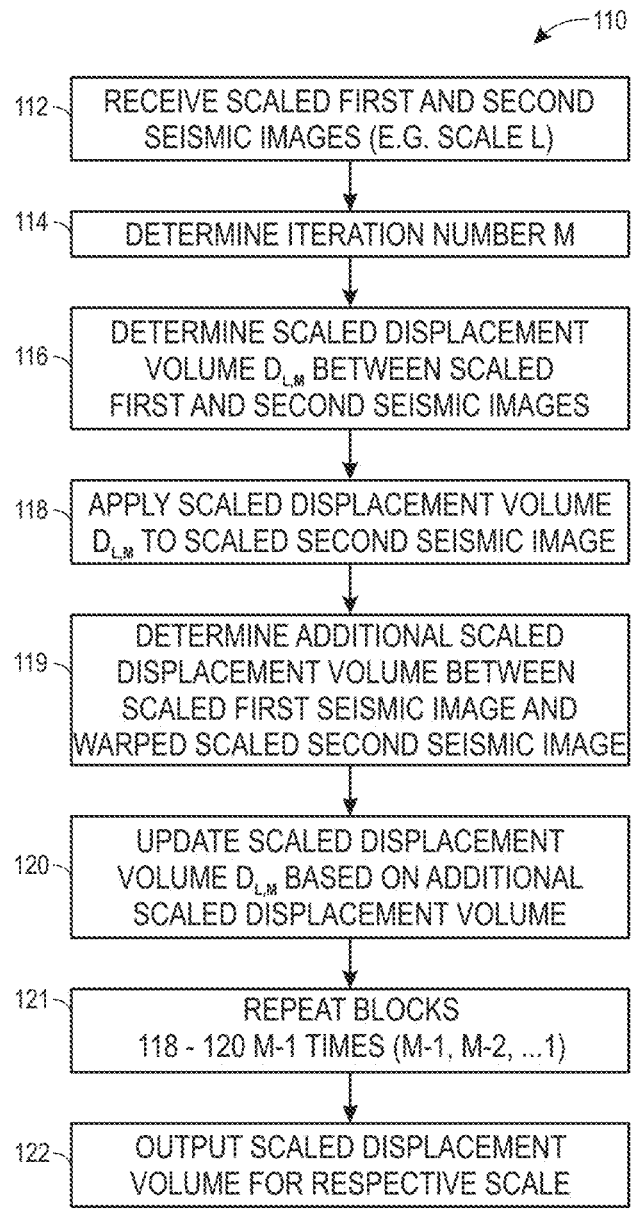
FIG. 6 illustrates a flow chart of a method for iteratively refining a multi-dimensional displacement volume used to determine the displacement between two seismic images acquired via the marine survey system of FIG. 2 or the land survey system of FIG. 3, in accordance with embodiments presented herein.

As discussed above, when determining the multi-dimensional displacement volume $(u_N,v_N,w_N)$ at any scale N, the computing system 60 may perform an iterative refinement technique according to a method 110 described in FIG. 6. As discussed above with regard to the method 90, although the method 110 is described as being performed in a particular order, it should be understood that the method 110 may be performed in any suitable order.

For the purposes of discussion, the following description of the method 110 will be discussed with reference to the discussion above regarding block 98 and determining the displacement volume $(u_L,v_L,w_L)$ at the last scale L. With this in mind and referring to block 112 of the method 110, at block 112 of the method 110, the computing system 60 may receive the first scaled seismic image $P_1^L(x,y,z)$ and the second scaled seismic image $P_2^L(x,y,z)$ at the last scale level L.

At block 114, the computing system 60 may determine an iteration number that indicates a number of iterations M in which the displacement volume $(u_L,v_L,w_L)$ may be determined. In certain embodiments, the number of iterations M may be received via user input. Alternatively, the computing system 60 may determine the number of iterations M based on previous trials of the method 110 performed with regard to similar types of subsurface regions.

After determining the number of iterations M, at block 116, the computing system 60 may determine a scaled displacement volume $(u_L,v_L,w_L)$ at the last scale L between the first scaled seismic image $P_1^L(x,y,z)$ and the second scaled seismic image $P_2^L(x,y,z)$ at the last scale level L using an optical flow algorithm, such as the Lucas-Kanade (LK) algorithm, the Horn-Schunck (HS) algorithm, or the like, as discussed above with regard to block 98.

In one embodiment, if the computing system 60 uses the LK algorithm, the computing system 60 may determine $N_x$, $N_y$ and $N_z$ for a window size $(2N_x+1)(2N_y+1)(2N_z+1)$, where $N_x$, $N_y$, and $N_z$ are integers defined by a user of the computing system 60. The window size may indicate a portion of the seismic image being analyzed. All the variables $N_x$, $N_y$, $N_z$ can vary as a function of current scale L. Generally, the LK algorithm may involve using a least squares approach to determine the displacement between the first scaled seismic image $P_1^L(x,y,z)$ and the second scaled seismic image $P_2^L(x,y,z)$. As such, the LK algorithm assumes a constant optical flow displacement field for a window centered at a point $(x,y,z)$ of interest.

As mentioned above, the window size is typically chosen as $(2N_x+1)(2N_y+1)(2N_z+1)$ where $N_x$, $N_y$ and $N_z$ are integers defined by users. As such, a constant displacement solution in a window may satisfy a total number of $(2N_x+1)(2N_y+1)(2N_z+1)$ optical flow equations, each one defined by a voxel within that window:

$$P_x(i)u+P_y(i)v+P_z(i)w+P_t(i)=0$$

where i is the index of voxel ranging from 1 to $(2N_x+1)(2N_y+1)(2N_z+1)$. The u, v, and w components of the displacement vector (u,v,w) at the pixel correspond to the x, y, and z components of the shift between the two seismic images. The z component is used to indicate the vertical direction of an image, where the vertical axis can be either depth or time. In this way, the system has more equations than unknowns and a unique displacement solution (u,v,w) can be calculated by a least squares approach. The displacement solution may then be assigned to the voxel at the center of the window. In turn, by using a moving window, the displacement field can be computed for all the voxels in an image. Keeping this in mind, it is clear that a larger window size produces a smoother displacement field, while a smaller window size generates a rougher displacement field.

With the foregoing in mind, the LK algorithm may receive the two seismic images $P_1^L(x,y,z)$ and $P_2^L(x,y,z)$ and determine spatial and temporal derivatives of each image:

$$P_x = \frac{\partial P}{\partial x}, P_y = \frac{\partial P}{\partial y}, P_z = \frac{\partial P}{\partial z} \text{ and } P_t = \frac{\partial P}{\partial t}.$$

The LK algorithm may then receive the integer values $N_x$, $N_y$, and $N_z$ to determine the window size $(2N_x+1)(2N_y+1)(2N_z+1)$.

The LK algorithm may then involve locating the window with a size $(2N_x+1)(2N_y+1)(2N_z+1)$ centered at the first voxel and constructing $(2N_x+1)(2N_y+1)(2N_z+1)$ optical flow equations using all the voxels in that window by assuming a uniform displacement in the window. The LK algorithm may then involve solving the equation system using least squares and assign the displacement solution to the first voxel (e.g., the center of that window). The LK algorithm may then involve repeating the steps of locating the window centered for each other voxel of the seismic images.

After determining the displacement solution for each voxel in the image, the LK algorithm may gather each displacement solution for each voxel in the image and output a displacement field that corresponds to the displacement volume formed by vectors $(u_L,v_L,w_L)$ at the last scale L between the first scaled seismic image $P_1^L(x,y,z)$ and the second scaled seismic image $P_2^L(x,y,z)$.

In another embodiment, the computing system 60 may use the HS algorithm to determine the displacement volume $(u_L,v_L,w_L)$ between the first scaled seismic image $P_1^L(x,y,z)$ and the second scaled seismic image $P_2^L(x,y,z)$. The $u_L$, $v_L$, and $w_L$ components of the displacement volume $(u_L,v_L,w_L)$ corresponds to the x, y, and z components of the shift between the two seismic images. With this in mind, an optical flow equation characterizes the displacement between the two seismic images as:

$$P_x u + P_y v + P_z w + P_t = 0 \qquad (1)$$

where $$P_x = \frac{\partial P}{\partial x}, P_y = \frac{\partial P}{\partial y} \text{ and } P_z = \frac{\partial P}{\partial z}$$

are spatial derivatives and $$P_t = \frac{\partial P}{\partial t}$$

is a temporal derivative. $P_x$, $P_y$, $P_z$ and $P_t$ may be calculated from the first scaled seismic image $P_1^1(x,y,z)$ and the second scaled seismic image $P_2^L(x,y,z)$. The z component is used to indicate the vertical direction of an image, where the vertical axis can be either depth or time.

Since Equation 1 is an under-determined problem and an additional constraint may be involved to solve the equation. As such, the HS algorithm may assume that neighboring points have similar motions, may penalize large spatial gradients of the optical flow displacement field, and may minimize the following object function E:

$$E = \iiint [(P_x u + P_y v + P_z w + P_t)^2 + \alpha^2(\|\nabla u\|^2 + \|\nabla v\|^2 + \|\nabla w\|^2)] \, dx\,dy\,dz \qquad (2)$$

where $\alpha$ is a weighting factor and $\|\nabla\|^2$ is defined by"

$$\|\nabla\|^2 = \left(\frac{\partial}{\partial x}\right)^2 + \left(\frac{\partial}{\partial y}\right)^2 + \left(\frac{\partial}{\partial z}\right)^2 \qquad (3)$$

With the foregoing in mind, the computing system 60 may minimize E results in an iterative solution derived by Horn and Schunck (1981) and extended to 3D as follows:

$$u^{n+1} = \bar{u}^n - \frac{P_x(P_x \bar{u}^n + P_y \bar{v}^n + P_z \bar{w}^n + P_t)}{\alpha^2 + (P_x)^2 + (P_y)^2 + (P_z)^2} \qquad (4)$$

$$v^{n+1} = \bar{v}^n - \frac{P_y(P_x \bar{u}^n + P_y \bar{v}^n + P_z \bar{w}^n + P_t)}{\alpha^2 + (P_x)^2 + (P_y)^2 + (P_z)^2} \qquad (5)$$

$$w^{n+1} = \bar{w}^n - \frac{P_z(P_x \bar{u}^n + P_y \bar{v}^n + P_z \bar{w}^n + P_t)}{\alpha^2 + (P_x)^2 + (P_y)^2 + (P_z)^2} \qquad (6)$$

where $\bar{u}$, $\bar{v}$ and $\bar{w}$ are local spatial averages (e.g., derived from Laplacians) of u, v and w, respectively. A choice of $\bar{u}$, $\bar{v}$ and $\bar{w}$ is defined below:

$$\bar{u}_{i,j,k} = \frac{1}{32}\left(\sum_{ii=-1,0,1}\sum_{jj=-1,0,1}\sum_{kk=-1,0,1} u_{i+ii,j+jj,k+kk} + u_{i-1,j,k} + \right. \qquad (7)$$
$$\left. u_{i+1,j,k} + u_{i,j-1,k} + u_{i,j+1,k} + u_{i,j,k-1} + u_{i,j,k+1} - u_{i,j,k}\right)$$

$$\bar{v}_{i,j,k} = \frac{1}{32}\left(\sum_{ii=-1,0,1}\sum_{jj=-1,0,1}\sum_{kk=-1,0,1} v_{i+ii,j+jj,k+kk} + v_{i-1,j,k} + \right. \qquad (8)$$
$$\left. v_{i+1,j,k} + v_{i,j-1,k} + v_{i,j+1,k} + v_{i,j,k-1} + v_{i,j,k+1} - v_{i,j,k}\right)$$

$$\bar{w}_{i,j,k} = \frac{1}{32}\left(\sum_{ii=-1,0,1}\sum_{jj=-1,0,1}\sum_{kk=-1,0,1} w_{i+ii,j+jj,k+kk} + w_{i-1,j,k} + \right. \qquad (9)$$
$$\left. w_{i+1,j,k} + w_{i,j-1,k} + w_{i,j+1,k} + w_{i,j,k-1} + w_{i,j,k+1} - w_{i,j,k}\right)$$

where i, j, and k are spatial indices of x, y, and z axes, respectively.

Equations (4)-(6) may involve initializing the values of u, v, and w as $u^0 = v^0 = w^0 = 0$. The run time for the HS algorithm is proportional to the iteration number N, which, like the weighting factor $\alpha$, may be provided by a user of the computing system 60 or determined by the computing system 60 based on the data. As such, the general process for determining the displacement volume $(u_L,v_L,w_L)$ based on the HS algorithm may involve the computing system 60 receiving the first scaled seismic image $P_1^L(x,y,z)$ and the second scaled seismic image $P_2^L(x,y,z)$ and determining the spatial and temporal derivatives based on the two images:

$$P_x = \frac{\partial P}{\partial x}, P_y = \frac{\partial P}{\partial y}, P_z = \frac{\partial P}{\partial z}, \text{ and } P_t = \frac{\partial P}{\partial t}.$$

The computing system 60 may then receive a number of iterations N and a weighting factor $\alpha$ and set the initial values of $u^0 = v^0 = w^0 = 0$ and n=0. The computing system 60 may then use $u''$, $v''$, and $w''$ to calculate $\bar{u}''$, $\bar{v}''$, and $\bar{w}''$ according to Equations (7), (8), and (9) above.

The computing system 60 may use the results of $\bar{u}''$, $\bar{v}''$, and $\bar{w}''$ to determine $u^{n+1}$, $v^{n+1}$, and $w^{n+1}$ according to Equations (4), (5), and (6). The computing system 60 may repeat the determination of $u''$, $v''$, and $w''$ and $\bar{u}''$, $\bar{v}''$, and $\bar{w}''$ until the iteration counter reaches the iteration number N. When the iteration counter is equal to N, the computing system 60 has determined the displacement volume $(u_L, v_L, w_L)$ between the first scaled seismic image $P_1^L(x,y,z)$ and the second scaled seismic image $P_2^L(x,y,z)$.

Referring back to FIG. 6, after determining the scaled displacement volume $(u_L, v_L, w_L)$ at the last scale L, the computing system 60 may proceed to block 118 and apply the scaled displacement volume $(u_L, v_L, w_L)$ to the second scaled seismic image $P_2^L(x,y,z)$, thereby generating a warped version of the second scaled seismic image $P'_2^L(x,y,z)$.

The computing system 60 may then proceed to block 119 and determine an additional scaled displacement volume $(\Delta(u_L, v_L, w_L))$ between the first scaled seismic image $P_1^L(x,y,z)$ and the warped version of the second scaled seismic image $P'_2^L(x,y,z)$.

The computing system 60 may then, at block 120, update scaled displacement volume $(u_L, v_L, w_L)$ based on the additional scaled displacement volume $(\Delta(u_L, v_L, w_L))$, that is, $(u_L, v_L, w_L) = (u_L, v_L, w_L) + \Delta(u_L, v_L, w_L)$. The computing system 60 may then proceed to block 121 and repeat blocks 118-120 M−1 times and eventually generate a iteratively refined displacement volume $(u_L^M, v_L^M, w_L^M)$ and M-refined warped version of the second scaled seismic image $P'_2^L(x,y,z)$.

At block 122, the computing system 60 output the iteratively refined scaled displacement volume $(u_L^M, v_L^M, w_L^M)$ as the displacement volume between the first scaled seismic image $P_1^L(x,y,z)$ and the second scaled seismic image $P_2^L(x,y,z)$ at the last scale L. In one embodiment, the computing system 60 may use the iteratively refined displacement volume $(u_L^M, v_L^M, w_L^M)$ at block 98 of the method 90 and then upscale the iteratively refined scaled displacement volume $(u_L^M, v_L^M, w_L^M)$ to the preceding scale L−1 and refine the displacement volume at scale L−1 according to block 100 and 101 of the method 90. As such, the computing system 60 may eventually determine the iteratively refined displacement volume $(u_1, v_1, w_1)$ at the original scale of the first seismic image $P_1^1(x,y,z)$ and a second seismic image $P_2^1(x,y,z)$. The iteratively refined displacement volume $(u_1, v_1, w_1)$ may thus represent the multi-dimensional displacement volume between the two seismic images and the computing system 60 or the like may use the multi-dimensional displacement volume as an indication of changes between the two seismic images to identify how the geological formations (e.g., hydrocarbon deposits) within the subsurface region 26 have changed over time, such that drilling and other hydrocarbon extraction processes may be modified to more efficiently extract the hydrocarbons. Based on the iteratively refined displacement volume $(u_1, v_1, w_1)$ and the second seismic image $P_2^1(x,y,z)$, the computing system 60 may produce a warped seismic image $P'_2^1(x,y,z)$. The displacement volume between $P_1^1(x,y,z)$ and $P_2^1(x,y,z)$ and the difference volume between $P_1^1(x,y,z)$ and $P'_2^1(x,y,z)$ may assist a user in identifying where new wells should be drilled, what well interventions to be performed, and the like.

Moreover, by determining the multi-dimensional displacement volume between two or more seismic images according to the techniques described herein, the computing system 60 may determine additional information (e.g., better image, better AVO, better reservoir characterization) regarding characteristics of the subsurface region. The computing system 60 may then use these characteristics to update various seismic images, seismic velocity models, reservoir maps, and the like to more accurately determine the locations and properties of various geological formations within the subsurface region 26 of the Earth. As a result, hydrocarbon exploration operations (e.g., drilling) may be improved by modifying the operations according to the updated locations and properties of the hydrocarbon deposits within the subsurface region 26 according to the updated seismic models.

Figure 7:
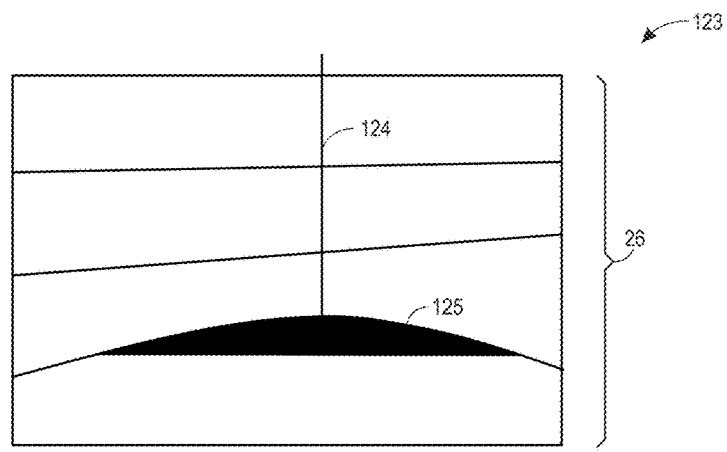
FIG. 7 illustrates an example seismic image generated based on seismic data acquired from seismic receivers, as described above with regard to FIGS. 2 and 3.

Keeping the foregoing in mind, FIGS. 7-10 illustrate example seismic images that relate to using results of the methods 90 and 110 of FIGS. 5 and 6 to improve hydrocarbon drilling and/or production operations. For instance, FIG. 7 illustrates an example seismic image 123 (e.g., $P_1^1(x,y,z)$) that is generated based on seismic data acquired in an earlier seismic survey, as described above with regard to FIGS. 2 and 3. As shown in the seismic image 123, various geological layers are present within the subsurface region 26 of the Earth. One of the geological layers of the seismic image 123 may include a hydrocarbon reservoir 125, which may correspond to a location within the Earth that includes hydrocarbons. In one embodiment, the seismic image 123 may be used to identify a potential well 124 that may be suitable to extract the hydrocarbons present in the hydrocarbon reservoir 125.

Figure 8:
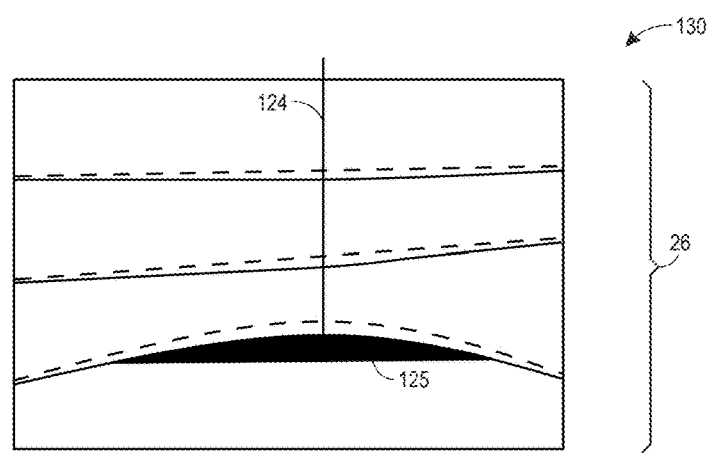
FIG. 8 illustrates an example of a seismic image inclusive of a warped image of itself, according to the method of FIG. 5.

FIG. 8 illustrates another example seismic image 130 (e.g., $P_2^1(x,y,z)$) that is generated based on seismic data acquired in a different seismic survey as described above with regard to FIGS. 2 and 3, at a later time as compared to the seismic data associated with the seismic image 123 of FIG. 7. Referring to FIG. 8, misalignments, which may be small for time-lapse seismic and difficult to appreciate in upon human inspection, exist between the example seismic image 123 and the example seismic image 130. As such, the corresponding positions of the layers depicted in the example seismic image 123 are illustrated in the example seismic image 130 as dashed lines.

Figure 9:
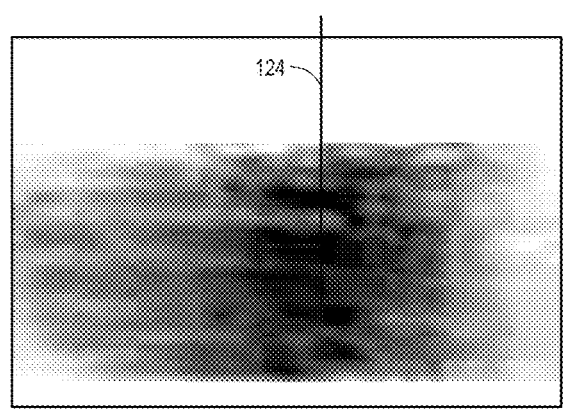
FIG. 9 illustrates an example of a displacement seismic image that characterizes a vertical shift volume between the example seismic image of FIG. 7 and the example unwarped seismic image of FIG. 8.
Figure 10:
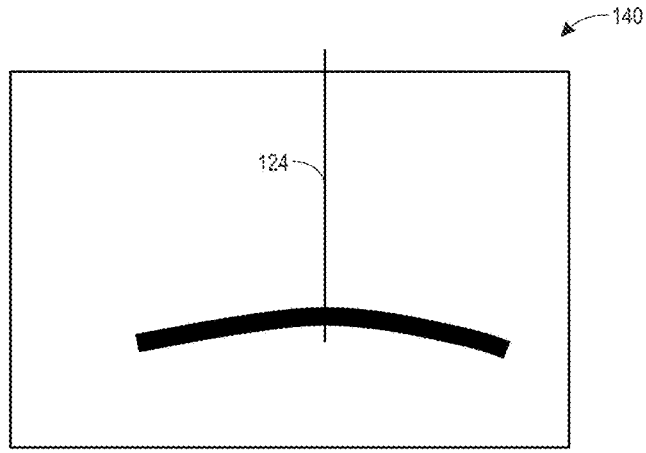
FIG. 10 illustrates an example of a seismic image having a difference volume between the example seismic image of FIG. 7 and the example warped seismic image of FIG. 8.

To quantify how the location and properties of the hydrocarbon reservoir 125 has changed over time, the computing system 60 may determine a difference volume between the example seismic image 123 and the warped image from the example seismic image 130 according to the method 90 described above, as illustrated in the difference image 140 of FIG. 10. The computing system 60 may also determine a shift volume between the example seismic image 123 and the example seismic image 130, as depicted in FIG. 9. Using the images depicted in FIGS. 9 and 10, the computing system 60 may indicate how the location and property of the hydrocarbon reservoir 125 has changed over time. In one embodiment, the computing system 60 may indicate an area previously encompassed by hydrocarbon reservoir 125 to assist the user in identifying the change. As a result, the hydrocarbon drilling and/or production operations may be adjusted to improve the production of the hydrocarbons based on the FIGS. 9 and 10.

In addition to determining the displacement image between two seismic images as described above, the computing system 60 may align multiple seismic images or flatten seismic gathers acquired via the marine survey system 20 or the land survey system 38. By aligning multiple seismic images or flattening the seismic gathers, the computing system 60 may better ascertain a final seismic image of the subsurface region 26 of the Earth based on the multiple seismic images produced by the seismic data acquired across the seismic survey. For instance, as described above, the flattened seismic gathers may be used to perform the method 10 of FIG. 1 that details various processes that may be undertaken based on the analysis of the acquired seismic data.

Figure 11:
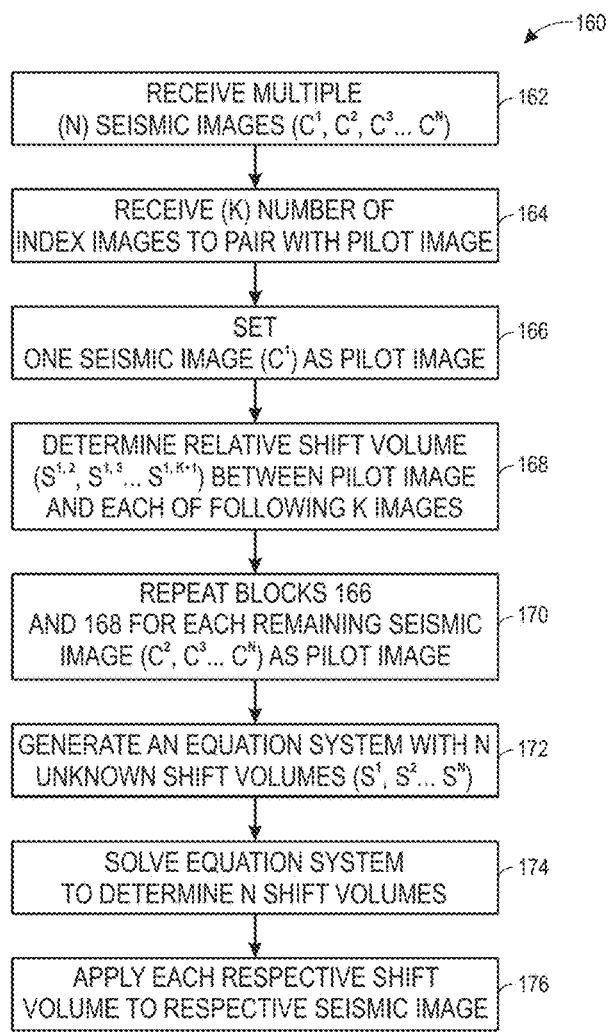
FIG. 11 illustrates a flow chart of a method for aligning multiple seismic images acquired via the marine survey system of FIG. 2 or the land survey system of FIG. 3, in accordance with embodiments presented herein.

With this in mind, FIG. 11 illustrates a flow chart of a method 160 for aligning multiple seismic images acquired via the marine survey system 30 or the land survey system 38. Although the following description of the method 160 is described as being performed in a particular order, it should be noted that the method 160 may be performed in any suitable order.

Referring now to FIG. 11, at block 162, the computing system 60 may receive multiple seismic images ($P_1(x,y,z)$, $P_2(x,y,z)$, . . . , $P_{N_h}(x,y,z)$) that represent the same subsurface area and are produced by the seismic data acquired in a seismic survey. The multiple seismic images are redundant measurements of the same subsurface area, out of a sorting and binning process of the input data or the intermediately-processed data in the seismic data processing. The binning criteria can be surface offsets, subsurface opening angles, source indices, receiver indices, or other properties. As such, each seismic image out of the multiple seismic images is an image produced using a subset (typically no overlapping) of the whole input data collected in a seismic survey. Because all of those multiple seismic images redundantly represent the same subsurface area, they should match each other and be aligned. In reality, misalignments are likely to exist due to noise in the data, migration velocity errors, and the like. Correcting the misalignments may results in more accurate seismic images for improved analysis and the like.

With this in mind, to align each of the seismic images ($P_1(x,y,z)$, $P_2(x,y,z)$ . . . , $P_{N_h}(x,y,z)$), (where $N_h$ corresponds to the total number of seismic images) the computing system 60 may determine a solution of vector (i.e., multi-dimensional) displacement or shift volumes (e.g., $\vec{S}_1(x,y,z)$, $\vec{S}_2(x,y,z)$, . . . , $\vec{S}_{N_h}(x,y,z)$) for each of the seismic images ($P_1(x,y,z)$, $P_2(x,y,z)$, . . . , $P_{N_h}(x,y,z)$). That is, the computing system 60 may apply each respective shift volume ($\vec{S}_1(x,y,z)$, $\vec{S}_2(x,y,z)$, . . . , $\vec{S}_{N_h}(x,y,z)$) to a respective seismic image ($P_1(x,y,z)$, $P_2(x,y,z)$, . . . , $P_{N_h}(x,y,z)$) to align each of the seismic images ($P_1(x,y,z)$, $P_2(x,y,z)$, . . . , $P_{N_h}(x,y,z)$) with each other, and thus make the seismic gathers flat. As such, the solution of the shift volume $\vec{S}_i(x,y,z)$ (i=1, 2, . . . , $N_h$) may include a spatially varying shift vector (u,v,w) along x, y and z directions respectively at each grid point (x,y,z).

Referring back to FIG. 11, after receiving the seismic images ($P_1(x,y,z)$, $P_2(x,y,z)$, . . . , $P_{N_h}(x,y,z)$), at block 164, the computing system 60 may receive a number (K) of maximum distance measured by image indices for an image to pair with a pilot image according to the method of 160. In certain embodiments, those multiple seismic images may be produced and indexed according to a criterion of bins such as surface offset bins, subsurface opening angle bins, source number bins, receiver number bins, etc. The number (K) may indicate how many of following seismic images to compare to a pilot seismic image. The pilot seismic image may be one of the seismic images ($P_1(x,y,z)$, $P_2(x,y,z)$, . . . , $P_{N_h}(x,y,z)$) that may be compared to K number of other seismic images that are indexed after the pilot seismic image, as will be discussed in greater detail below. It should be noted that the comparison step will be skipped if the images to be compared are beyond the index range $N_h$.

At block 166, the computing system 60 may set one seismic image (e.g., $P_1(x,y,z)$) as the pilot seismic image. As such, at block 168, the computing system 60 may determine a relative shift volume between the first pilot seismic image $P_1(x,y,z)$ and each seismic image that is within K index number away from the first pilot seismic image. For instance, if K=2, the computing system 60 may determine a first relative shift volume $\vec{S}_{1,2}(x,y,z)$ between the pilot seismic image $P_1(x,y,z)$ and a second seismic image $P_2(x,y,z)$, and a second relative shift volume $\vec{S}_{1,3}(x,y,z)$ between the pilot seismic image $P_1(x,y,z)$ and a third seismic image $P_3(x,y,z)$. The computing system 60 may determine the relative shift volume $\vec{S}_{i,j}(x,y,z)$ (where i is the index of the pilot image, and j is the index of the following image to be compared) according to the scaling and iterative methods 90 and 110 described above with respect to FIGS. 5 and 6.

In certain embodiments, the computing system 60 may characterize the determined relative shift volumes (measurements) with respect to each vector shift volume (unknown) ($\vec{S}_1(x,y,z)$, $\vec{S}_2(x,y,z)$, . . . , $\vec{S}_{N_h}(x,y,z)$) associated with each image. For instance, the relative shift volume between the pilot seismic image $P_1(x,y,z)$ and a second seismic image $P_2(x,y,z)$ may be characterized as the difference between a vector shift volume $\vec{S}_2(x,y,z)$ of the pilot seismic image and a vector shift volume $\vec{S}_2(x,y,z)$ of the second seismic image, as shown in Equation 10 below.

$$-\vec{S}_1(x,y,z)+\vec{S}_2(x,y,z)=\vec{S}_{1,2}(x,y,z), \quad (10)$$

In the same manner, the relative shift volume between the pilot seismic image $P_1(x,y,z)$ and a third seismic image $P_3(x,y,z)$ may be characterized as the difference between a vector shift volume $\vec{S}_1(x,y,z)$ of the pilot seismic image and a vector shift volume $\vec{S}_3(x,y,z)$ of the third seismic image, as shown in Equation 11 below.

$$-\vec{S}_1(x,y,z)+\vec{S}_3(x,y,z)=\vec{S}_{1,3}(x,y,z), \quad (11)$$

At block 170, the computing system 60 may repeat blocks 166 and 168 for each remaining seismic image of the received seismic images ($P_2(x,y,z)$, $P_3(x,y,z)$, . . . , $P_{N_h}(x,y,z)$). That is, the computing system 60 may set another seismic image (e.g., $P_2(x,y,z)$) as the pilot seismic image (block 166) and determine the relative shift volume between the newly assigned pilot seismic image and each other seismic image located within K number away from the pilot seismic image. For instance, if K=2, the computing system 60 may determine a first relative shift volume $\vec{S}_{2,3}(x,y,z)$ between the pilot seismic image $P_2(x,y,z)$ and a third seismic image $P_3(x,y,z)$, and a second relative shift volume $\vec{S}_{2,4}(x,y,z)$ between the pilot seismic image $P_2(x,y,z)$ and a fourth seismic image $P_4(x,y,z)$. In the same manner as described above, the computing system 60 may then characterize the determined relative shift measurements with respect to each unknown shift volume ($\vec{S}_1(x,y,z)$, $\vec{S}_2(x,y,z)$, . . . , $\vec{S}_{N_h}(x,y,z)$) as shown below.

$$-\vec{S}_2(x,y,z)+\vec{S}_3(x,y,z)=\vec{S}_{2,3}(x,y,z), \quad (12)$$

$$-\vec{S}_2(x,y,z)+\vec{S}_4(x,y,z)=\vec{S}_{2,4}(x,y,z), \quad (13)$$

With the foregoing in mind, since the pilot seismic image is compared to K number of seismic images that are indexed after the pilot seismic image, it should be noted that as the index number of the pilot seismic image increases, the number of seismic images that may be compared to the pilot seismic image may decrease when the index number of the pilot seismic image reaches towards the end ($N_h$) of the input of seismic images. For example, if K=4 and the computing system 60 receives eight ($N_h$=8) seismic images (e.g., $P_1(x,y,z)$, $P_2(x,y,z)$, . . . , $P_8(x,y,z)$), the computing system 60 may compare the pilot seismic image to four other seismic images when the pilot seismic image corresponds to the first four indexed seismic images (e.g., $P_1(x,y,z)$, $P_2(x,y,z)$, . . . . $P_4(x,y,z)$). However, when the computing system 60 sets the fifth indexed seismic image (e.g., $P_5(x,y,z)$) as the pilot seismic image, the computing system 60 may not have enough images to compare to the pilot seismic image that is part of the eight input seismic images. To better illustrate this concept, FIG. 12 depicts how pairs of the eight seismic images are compared with each other to determine relative shift measurements ($\vec{S}_{i,j}(x,y,z)$) when K=4.

Referring again to FIG. 11, at block 172, the computing system 60 may generate an equation system based on the characterization of each determined relative shift measurements ($\vec{S}_{i,j}(x,y,z)$) with respect to a selection of respective vector shift unknown volumes ($\vec{S}_1(x,y,z)$, $\vec{S}_2(x,y,z)$, . . . , $\vec{S}_{N_h}(x,y,z)$) that are associated with the two respective seismic images being compared. As such, the equation system may include a number of equations that characterize each relative shift vector measurements ($\vec{S}_{i,j}(x,y,z)$) that correspond to each respective vector shift unknown volume ($\vec{S}_1(x,y,z)$, $\vec{S}_2(x,y,z)$, . . . $\vec{S}_{N_h}(x,y,z)$).

The computing system 60 may have K (or less when $i_{pilot}+K>N_h$) measurements and equations for every pilot image. That is, for every pilot image $P_{i_{pilot}}(x,y,z)$ and its pair $P_{i_{pilot}+j}(x,y,z)$, its associated equation can be generalized as below:

$$-\vec{S}_{i_{pilot}}(x,y,z)+\vec{S}_{i_{pilot}+j}(x,y,z)=\vec{S}_{i_{pilot},i_{pilot}+j}(x,y,z), \quad (14)$$

where $i_{pilot} \in [1\ N_{pilot}]$, $j \in [1\ K]$ and $i_{pilot}+j \leq N_h$. In total, the computing system 60 can obtain $N_{pilot}K$ (or less if $N_{pilot}+K>N_h$) measurements from using the first $N_{pilot}$ images as pilot images. Since the computing system 60 obtains $N_h$ unknowns $\vec{S}_i(x,y,z)$ (i=1, 2, . . . , $N_h$), the resulting equation system is an over determined linear equation system. As such, the computing system 60 may determine a solution to the equation system using a least squares approach (e.g., LSQR), or the like. In one example, the computing system 60 may determine the solution by using redundant measurements and a least squares solver is very similar to a process described by VanDecar and Crosson's (1990), except that the shift of every voxel may be estimated in the whole image volume, while the VanDecar and Crosson process estimates the shift of first arrival of seismic traces. Although the solution shifts obtained by the computing system 60 are relative shifts, the computing system 60 may then determine final shift values by choosing a reference seismic image.

In some embodiments, after determining the vector shift volume ($\vec{S}_1(x,y,z)$, $\vec{S}_2(x,y,z)$, . . . , $\vec{S}S_{N_h}(x,y,z)$) for each seismic image ($P_1(x,y,z)$, $P_2(x,y,z)$, . . . , $P_{N_h}(x,y,z)$) received at block 162, the computing system 60 may determine an error or uncertainty map associated with each vector shift volume ($\vec{S}_1(x,y,z)$, $\vec{S}_2(x,y,z)$, . . . , $\vec{S}_{N_h}(x,y,z)$).

Generally, the computing system 60 may determine an error value for each solution $\vec{S}_i(x,y,z)$ based on an average of all the residuals of equations within the equation system that contain $\vec{S}_i(x,y,z)$. That is, the error $\vec{e}_i(x,y,z)$ (i=1, 2, . . . , $N_h$) ($\vec{e}_i$ is a vector volume with x, y and z components) may be represented as:

$$\vec{e}_i(x,y,z)=(\Sigma_{when\ i_{pilot}=i}|\vec{S}_{i_{pilot},i_{pilot}+j}(x,y,z)+\vec{S}_{i_{pilot}}(x,y,z)-\vec{S}_{i_{pilot}+j}(x,y,z)|+\Sigma_{when\ i_{pilot}+j=i}|\vec{S}_{i_{pilot},i_{pilot}+j}(x,y,z)+\vec{S}_{i_{pilot}}(x,y,z)-\vec{S}_{i_{pilot}+j}(x,y,z)|)/N_{hit} \quad (15)$$

$$\vec{e}_i(x,y,z)=\text{sqrt}(\Sigma_{when\ i_{pilot}=i}|\vec{S}_{i_{pilot},i_{pilot}+j}(x,y,z)+\vec{S}_{i_{pilot}}(x,y,z)-\vec{S}_{i_{pilot}+j}(x,y,z)|^2+\Sigma_{when\ i_{pilot}+j=i}|\vec{S}_{i_{pilot},i_{pilot}+j}(x,y,z)+\vec{S}_{i_{pilot}}(x,y,z)-\vec{S}_{i_{pilot}+j}(x,y,z)|^2)/N_{hit} \quad (16)$$

where $i \in [1\ N_h]$, $i_{pilot} \in [1\ N_{pilot}]$, $j \in [1\ K]$, $i_{pilot}+j \leq N_h$, $N_{hit}$ is the total hit count number for the cases of $i_{pilot}=i$ and $i_{pilot}+j=i$, and sqrt is the square root operation. It should be noted that Equation (15) is based on L1 norm and Equation (16) is based on L2 norm.

The error volume $\vec{e}_i(x,y,z)$ may quantify a quality of the input seismic images or gathers. A large error volume may indicate that the corresponding portion of input images or gathers may be difficult to align, while a small error volume may indicate a good quality of the input images or gathers that have clear events that may be aligned. In practice, the error map can be used to mask the low-quality portion of input images or gathers.

Referring again to FIG. 11, at block 176, the computing system 60 may apply a respective vector shift volume ($\vec{S}_1(x,y,z)$, $\vec{S}_2(x,y,z)$, . . . , $\vec{S}_{N_h}(x,y,z)$), determined at block 174, to a respective seismic image ($P_1(x,y,z)$, $P_2(x,y,z)$, . . . , $P_{N_h}(x,y,z)$) received at block 162. As a result, the computing system 60 may generate aligned seismic images ($P'_1(x,y,z)$, $P'_2(x,y,z)$, . . . , $P'_{N_h}(x,y,z)$), such that the seismic events represented in each seismic image ($P'_1(x,y,z)$, $P'_2(x,y,z)$, . . . , $P'_{N_h}(x,y,z)$) may align with those of the other seismic images.

After obtaining aligned seismic images ($P'_1(x,y,z)$, $P'_2(x,y,z)$, . . . , $P'_{N_h}(x,y,z)$), the computing system 60 may generate a final seismic image that represents the geological formations within the subsurface region 26 of the Earth that accounts for data provided by each of the received seismic images ($P_1(x,y,z)$, $P_2(x,y,z)$, . . . , $P_{N_h}(x,y,z)$). As such, hydrocarbon drilling and production operations may use the final seismic image to identify locations and properties of hydrocarbon reservoirs, determine how to efficiently extract hydrocarbons, and the like. In addition, the aligned seismic images ($P'_1(x,y,z)$, $P'_2(x,y,z)$, . . . , $P'_{N_h}(x,y,z)$) may also be used by the computing system 60 to perform additional analysis regarding the subsurface region 26. For instance, the computing system 60 may perform an amplitude versus offset (AVO) analysis to determine a rock's fluid content, porosity, density or seismic velocity, shear wave information, fluid indicators (hydrocarbon indications), and other similar types of information regarding the subsurface region 26.

Figure 13:
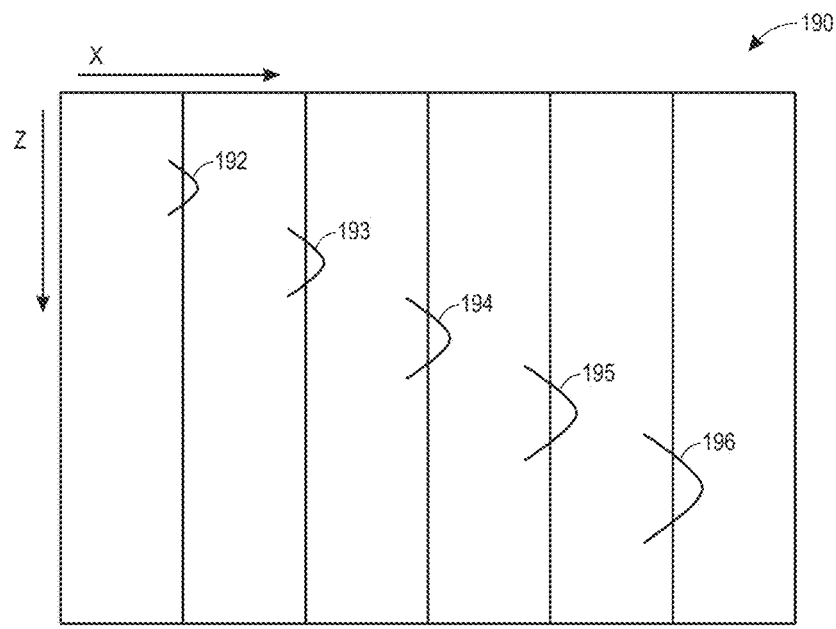
FIG. 13 depicts a number of seismic image representations prior to aligning seismic images acquired via a seismic survey according to the method of FIG. 11, in accordance with an embodiment.

Keeping the foregoing in mind, FIG. 13 depicts a seismic gather at one (x,y) location prior to aligning seismic images acquired via a seismic survey according to the method 160 of FIG. 11. As shown in FIG. 13, a collection 190 of seismic gather representations 192-196 are depicted with respect to two spatial directions (e.g., x, z). As discussed above, due to various factors such as migration velocity errors, each seismic image may not be properly aligned with each other so a gather extracted from those images may not appear flat.

Figure 14:
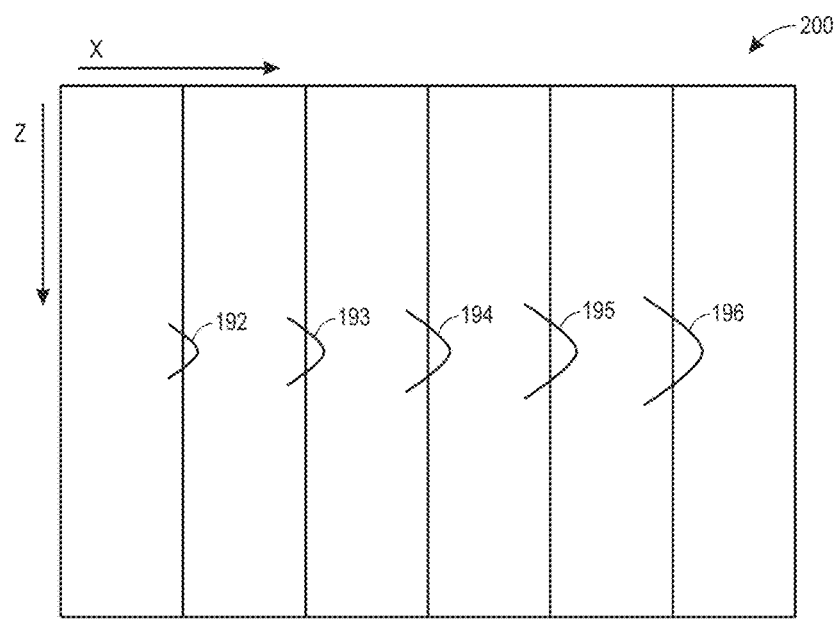
FIG. 14 depicts a number of seismic image representations after aligning seismic images acquired via a seismic survey according to the method of FIG. 11, in accordance with an embodiment.

By employing the method 160 described above, the computing system 60 may align the seismic gather representations 192-196, such that the corresponding seismic images may be properly analyzed to determine shifts, amplitude changes, and other properties regarding the subsurface region 26. For instance, FIG. 14 depicts a collection 200 of a seismic gather after aligning seismic images acquired via a seismic survey according to the method 160 of FIG. 11. As shown in FIG. 14, the seismic events depicted by the seismic gather representations 192-196 may be aligned with each other to perform various amplitude-versus-offset (AVO) analysis to determine the fluid content, porosity, density or seismic velocity, shear wave information, fluid indicators (e.g. hydrocarbon deposits), and the like regarding the geological layers of the subsurface region 26. Moreover, after aligning the seismic gather representations 192-196, the flattened gather may be used for producing a high quality stack, which may assist with the identification of hydrocarbons in the subsurface region 26. Further, shifts along seismic image gathers may be estimated and used for tomographic residual move-out (RMO) picking, and therefore to update the migration velocity model and provide a more accurate seismic image and description of the geological formations present in the subsurface region 26.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method for aligning a plurality of seismic images associated with a subsurface region of the Earth, comprising:
   receiving, via a processor, the plurality of seismic images acquired via one or more seismic surveys, wherein the plurality of seismic images represents the subsurface region of the Earth;
   determining, via the processor, a first respective relative shift volume between a first seismic image of the plurality of seismic images and a second seismic image of the plurality of seismic images, a second respective relative shift volume between the first seismic image and a third seismic image of the plurality of seismic images, and a third respective relative shift volume between the second seismic image of the plurality of seismic images and the third seismic image of the plurality of seismic images;
   determining a first shift volume associated with the first seismic image and a second shift volume associated with the second seismic image based on the first, second, and third respective relative shift volumes, wherein the first shift volume indicates position differences in space between seismic events; and
   applying, via the processor, the first shift volume to the first seismic image and the second shift volume to the second seismic image to generate a first shifted seismic image and a second shifted seismic image, respectively, wherein the first and second shifted seismic images are aligned with each other and indicate one or more properties of hydrocarbon deposits within the subsurface region of the Earth.

2. The method of claim 1, wherein determining the first respective relative shift volume comprises:
   generating, via the processor, a first scaled image based on the first seismic image and a second scaled image based on the second seismic image;
   determining, via the processor, a scaled displacement volume between the first scaled image and the second scaled image based on an optical flow algorithm; and
   determining, via the processor, a displacement volume based on the scaled displacement volume and a scaling function used to generate the first and second scaled images based on the first and second seismic images.

3. The method of claim 1, wherein determining the first respective relative shift volume comprises:
   (a) receiving a number of iterations M;
   (b) obtaining, via the processor, the displacement volume at a current scale using an optical flow algorithm or the scaled displacement volume from a previous scale;
   (c) applying, via the processor, the displacement volume to the second seismic image thereby generating a third image;
   (d) determining, via the processor, a second displacement volume between the first seismic image and the third image;
   (e) updating, via the processor, the displacement volume by adding the second displacement volume to the displacement volume;
   (f) iteratively repeating blocks (c)-(e) M−1 times by using a respective second displacement volume and a respective third image each time, thereby determining an M-number displacement volume; and
   (g) assigning the M-number displacement volume as the displacement volume.

4. The method of claim 2, wherein the optical flow algorithm comprises a multi-dimensional Horn-Schunck algorithm or a multi-dimensional Lucas-Kanade algorithm.

5. The method of claim 1, wherein determining the first shift volume, and the second shift volume comprises applying a least squares method to a linear equation system comprising the first, second, and third respective relative shift volumes.

6. The method of claim 1, comprising deriving, via the processor, a plurality of errors associated with the first seismic image and the second seismic image based on the first, second, and third respective relative shift volumes.

7. The method of claim 1, comprising displaying the first shifted seismic image and the second shifted seismic image on a display or other tangible element.

8. The method of claim 1, wherein determining the first respective relative shift volume comprises:
   receiving, via the processor, a number K of index images; and
   determining, via the processor, a respective first relative shift volume between the first seismic image and each respective seismic image of the plurality of seismic images positioned within the number K of index images away, wherein the number K of index images associated with the first seismic image is based on a second number of images indexed after the first seismic image with respect to the plurality of seismic images.

9. A non-transitory computer-readable medium, comprising computer-executable instructions configured to cause a processor to:

(a) receive a plurality of seismic images acquired via a plurality of seismic sensors, wherein the plurality of seismic images represents a subsurface region of the Earth;
(b) receive a number K of index images;
(c) assign one of the plurality of seismic images as a pilot image;
(d) determine a first respective relative shift volume between the pilot image and each seismic image of the plurality of seismic images within the number K of index images to the pilot image;
(e) repeat blocks (c) and (d) for each remaining seismic image of the plurality of seismic images as the pilot image, thereby determining a plurality of relative shift volumes;
(f) determine N number of shift volumes based on the plurality of relative shift volumes, wherein the N number corresponds to a number of the plurality of seismic images received, and wherein each respective shift volume of the N number of shift volumes corresponds to a respective seismic image of the plurality of seismic images, and at least one shift volume indicates position differences in space between seismic events; and
(g) apply each respective shift volume of the N number of shift volumes to the respective seismic image of the plurality of seismic images, thereby generating a plurality of shifted seismic images, wherein each of the plurality of shifted seismic images are aligned with each other and indicate one or more properties of hydrocarbon deposits within the subsurface region of the Earth.

10. The non-transitory computer-readable medium of claim 9, wherein the number K of index images is received via user input.

11. The non-transitory computer-readable medium of claim 9, wherein the first respective relative shift volume comprises a volume of shift scalars or vectors.

12. The non-transitory computer-readable medium of claim 9, wherein the computer-executable instructions cause the processor to determine amplitude properties, velocity properties, rock type properties, or any combination thereof regarding one or more geological layers within the subsurface region of the Earth based on the plurality of shifted seismic images.

13. The non-transitory computer-readable medium of claim 9, wherein a number of seismic images within the number K of index images to the pilot image is different for two pilot seismic images of the plurality of seismic images.

14. The non-transitory computer-readable medium of claim 9, wherein the first respective relative shift volume is determined using an iterative refinement approach or/and a multi-scale approach and an optical flow algorithm.

15. The non-transitory computer-readable medium of claim 14, wherein the computer-executable instructions are configured to cause the plurality of shifted seismic images to be printed or displayed.

16. A method for drilling into a subsurface region of the Earth, comprising:
analyzing a plurality of shifted seismic images associated with the subsurface region, wherein each of the plurality of shifted seismic images is aligned with each other; and
performing one or more drilling operations or one or more production operations into the subsurface region based on an analysis of the plurality of shifted seismic images, wherein the plurality of shifted seismic images is determined by:
receiving, via a processor, a plurality of seismic images acquired in one or more seismic surveys, wherein the plurality of seismic images represents the subsurface region of the Earth;
determining, via the processor, a first respective relative shift volume between a first seismic image of the plurality of seismic images and a second seismic image of the plurality of seismic images, a second respective relative shift volume between the first seismic image and a third seismic image of the plurality of seismic images, and a third respective relative shift volume between the second seismic image of the plurality of seismic images and the third seismic image of the plurality of seismic images;
determining a first shift volume associated with the first seismic image and a second shift volume associated with the second seismic image based on the first, second, and third respective relative shift volumes, wherein the first shift volume indicates position differences in space between seismic events; and
applying, via the processor, the first shift volume to the first seismic image and the second shift volume to the second seismic image to generate a first shifted seismic image and a second shifted seismic image, respectively, of the plurality of shifted seismic images.

17. The method of claim 16, wherein the first seismic image is associated with a first set of seismic data acquired by a set of seismic receivers during a marine seismic survey or a land seismic survey.

18. The method of claim 17, wherein the second seismic image is associated with a second set of seismic data acquired by the set of seismic receivers based on a same seismic source associated with the first set of seismic data.

19. The method of claim 18, wherein the first shift volume and the second shift volume are determined using a least squares method.

20. The method of claim 16, wherein the first seismic image is associated with a first set of seismic data acquired by a first seismic receiver of a seismic survey, and wherein the second seismic image is associated with a second set of seismic data acquired by a second seismic receiver of the seismic survey.

21. A method (16) for aligning a plurality of seismic images associated with a subsurface region of the Earth, comprising:
receiving (162), via a processor (64), the plurality of seismic images acquired via one or more seismic surveys, wherein the plurality of seismic images represents the subsurface region of the Earth;
determining (168), via the processor (64), a first respective relative shift volume between a first seismic image of the plurality of seismic images and a second seismic image of the plurality of seismic images, a second respective relative shift volume between the first seismic image and a third seismic image of the plurality of seismic images, and a third respective relative shift volume between the second seismic image of the plurality of seismic images and the third seismic image of the plurality of seismic images;
determining (174) a first shift volume associated with the first seismic image and a second shift volume associated with the second seismic image based on the first, second, and third respective relative shift volumes, wherein the first shift volume indicates position differences in space between seismic events; and
applying (176), via the processor (64), the first shift volume to the first seismic image and the second shift volume to the second seismic image to generate a first shifted seismic image and a second shifted seismic image, respectively, wherein the first and second shifted seismic images are aligned with each other and indicate one or more properties of hydrocarbon deposits within the subsurface region (26) of the Earth.

22. The method of claim 21, wherein determining the first respective relative shift volume comprises:
generating, via the processor (64), a first scaled image based on the first seismic image and a second scaled image based on the second seismic image;
determining, via the processor (64), a scaled displacement volume between the first scaled image and the second scaled image based on an optical flow algorithm; and
determining, via the processor (64), a displacement volume based on the scaled displacement volume and a scaling function used to generate the first and second scaled images based on the first and second seismic images.

23. The method of claim 21, wherein determining the first respective relative shift volume comprises:
(a) receiving a number of iterations M;
(b) obtaining, via the processor (64), the displacement volume at a current scale using an optical flow algorithm or the scaled displacement volume from a previous scale;
(c) applying, via the processor (64), the displacement volume to the second seismic image thereby generating a third image;
(d) determining, via the processor (64), a second displacement volume between the first seismic image and the third image;
(e) updating, via the processor (64), the displacement volume by adding the second displacement volume to the displacement volume;
(f) iteratively repeating blocks (c)-(e) M−1 times by using a respective second displacement volume and a respective third image each time, thereby determining an M-number displacement volume; and
(g) assigning the M-number displacement volume as the displacement volume.

24. The method of claim 22, wherein the optical flow algorithm comprises a multi-dimensional Horn-Schunck algorithm or a multi-dimensional Lucas-Kanade algorithm.

25. The method of claim 21, wherein determining the first shift volume, and the second shift volume comprises applying a least squares method to a linear equation system comprising the first, second, and third respective relative shift volumes.

26. The method of claim 21, comprising deriving, via the processor (64), a plurality of errors associated with the first seismic image and the second seismic image based on the first, second, and third respective relative shift volumes.

27. The method of claim 21, comprising displaying the first shifted seismic image and the second shifted seismic image on a display or other tangible element.

28. The method of claim 21, wherein determining the first respective relative shift volume comprises:
receiving, via the processor (64), a number K of index images; and
determining, via the processor (64), a respective first relative shift volume between the first seismic image and each respective seismic image of the plurality of seismic images positioned within the number K of index images away, wherein the number K of index images associated with the first seismic image is based on a second number of images indexed after the first seismic image with respect to the plurality of seismic images.

29. A non-transitory computer-readable medium (66), comprising computer-executable instructions configured to cause a processor (64) to:
(a) receive (162) a plurality of seismic images acquired via a plurality of seismic sensors, wherein the plurality of seismic images represents a subsurface region of the Earth;
(b) receive (164) a number K of index images;
(c) assign (166) one of the plurality of seismic images as a pilot image;
(d) determine (168) a first respective relative shift volume between the pilot image and each seismic image of the plurality of seismic images within the number K of index images to the pilot image;
(e) repeat (170) blocks (c) and (d) for each remaining seismic image of the plurality of seismic images as the pilot image, thereby determining a plurality of relative shift volumes;
(f) determine (174) N number of shift volumes based on the plurality of relative shift volumes, wherein the N number corresponds to a number of the plurality of seismic images received, and wherein each respective shift volume of the N number of shift volumes corresponds to a respective seismic image of the plurality of seismic images, wherein at least one shift volume indicates position differences in space between seismic events; and
(g) apply (176) each respective shift volume of the N number of shift volumes to the respective seismic image of the plurality of seismic images, thereby generating a plurality of shifted seismic images, wherein each of the plurality of shifted seismic images are aligned with each other and indicate one or more properties of hydrocarbon deposits within the subsurface region (26) of the Earth.

30. The non-transitory computer-readable medium (66) of claim 29, wherein the number K of index images is received via user input.

31. The non-transitory computer-readable medium (66) of claim 29, wherein the first respective relative shift volume comprises a volume of shift scalars or vectors.

32. The non-transitory computer-readable medium (66) of claim 29, wherein the computer-executable instructions cause the processor (64) to determine amplitude properties, velocity properties, rock type properties, or any combination thereof regarding one or more geological layers within the subsurface region of the Earth based on the plurality of shifted seismic images.

33. The non-transitory computer-readable medium (66) of claim 29, wherein a number of seismic images within the number K of index images to the pilot image is different for two pilot seismic images of the plurality of seismic images.

34. The non-transitory computer-readable medium (66) of claim 29, wherein the first respective relative shift volume is determined using an iterative refinement approach or/and a multi-scale approach and an optical flow algorithm.

35. The non-transitory computer-readable medium (66) of claim 34, wherein the computer-executable instructions are configured to cause the plurality of shifted seismic images to be printed or displayed.

* * * * *